US009207502B2

(12) United States Patent
Takagi et al.

(10) Patent No.: US 9,207,502 B2
(45) Date of Patent: Dec. 8, 2015

(54) LIQUID CRYSTAL OPTICAL DEVICE AND DISPLAY APPARATUS

(71) Applicant: KABUSHIKI KAISHA TOSHIBA, Minato-ku, Tokyo (JP)

(72) Inventors: Ayako Takagi, Kanagawa-ken (JP); Shinichi Uehara, Tokyo (JP); Masako Kashiwagi, Kanagawa-ken (JP); Masahiro Baba, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 264 days.

(21) Appl. No.: 13/940,392

(22) Filed: Jul. 12, 2013

(65) Prior Publication Data

US 2014/0104556 A1    Apr. 17, 2014

(30) Foreign Application Priority Data

Oct. 17, 2012 (JP) .................................. 2012-230060

(51) Int. Cl.
| G02F 1/133 | (2006.01) |
| G02F 1/1343 | (2006.01) |
| H04N 13/04 | (2006.01) |
| G09G 3/36 | (2006.01) |
| G02F 1/29 | (2006.01) |

(52) U.S. Cl.
CPC ...... *G02F 1/134336* (2013.01); *G02F 1/13306* (2013.01); *G02F 1/134309* (2013.01); *G02F 1/29* (2013.01); *G09G 3/3622* (2013.01); *H04N 13/0402* (2013.01); *H04N 13/0454* (2013.01); *G02F 2203/28* (2013.01)

(58) Field of Classification Search
CPC ............. G02F 1/3306; H04N 13/0454; G09G 3/3611–3/3696; G09G 2310/0264; G09G 2310/067
See application file for complete search history.

(56) References Cited

U.S. PATENT DOCUMENTS

| 2005/0001807 A1* | 1/2005 | Lee et al. .......... G02F 1/134363 345/92 |
| 2007/0183015 A1* | 8/2007 | Jacobs et al. .......... G02F 1/1323 359/245 |
| 2010/0208152 A1* | 8/2010 | Kim et al. ................. G02B 3/14 349/15 |
| 2011/0084961 A1* | 4/2011 | Son et al. ........... G02B 27/2242 345/419 |
| 2011/0228181 A1* | 9/2011 | Jeong et al. .......... G02B 5/1842 349/15 |
| 2012/0105750 A1* | 5/2012 | Yoon et al. ............. G09G 3/003 349/15 |
| 2012/0162592 A1 | 6/2012 | Takagi et al. |
| 2012/0236043 A1* | 9/2012 | Jung et al. .......... G02B 27/2214 345/690 |
| 2012/0320170 A1* | 12/2012 | Lee et al. ........... G02B 27/2214 348/54 |

FOREIGN PATENT DOCUMENTS

JP       2011-197640       10/2011

* cited by examiner

*Primary Examiner* — Kathy Wang-Hurst
*Assistant Examiner* — David Tung
(74) *Attorney, Agent, or Firm* — Finnegan, Henderson, Farabow, Garrett & Dunner, L.L.P.

(57) ABSTRACT

A liquid crystal optical device includes a liquid crystal optical unit and a drive unit. The liquid crystal optical unit includes a first and second substrate unit, and a liquid crystal layer. The first substrate unit includes a first substrate, a plurality of first electrodes, a second electrode, and a third electrode. The second substrate unit includes a second substrate, a plurality of first opposing electrodes, a second opposing electrode, and a third opposing electrode. The drive unit is configured to implement a first operation including subjecting the first electrodes to a first potential, subjecting the second electrode to a second potential, subjecting the third electrode to a third potential, subjecting the first opposing electrodes to a first opposing potential, subjecting the second opposing electrode to a second opposing potential, and subjecting the third opposing electrode to a third opposing potential.

20 Claims, 11 Drawing Sheets

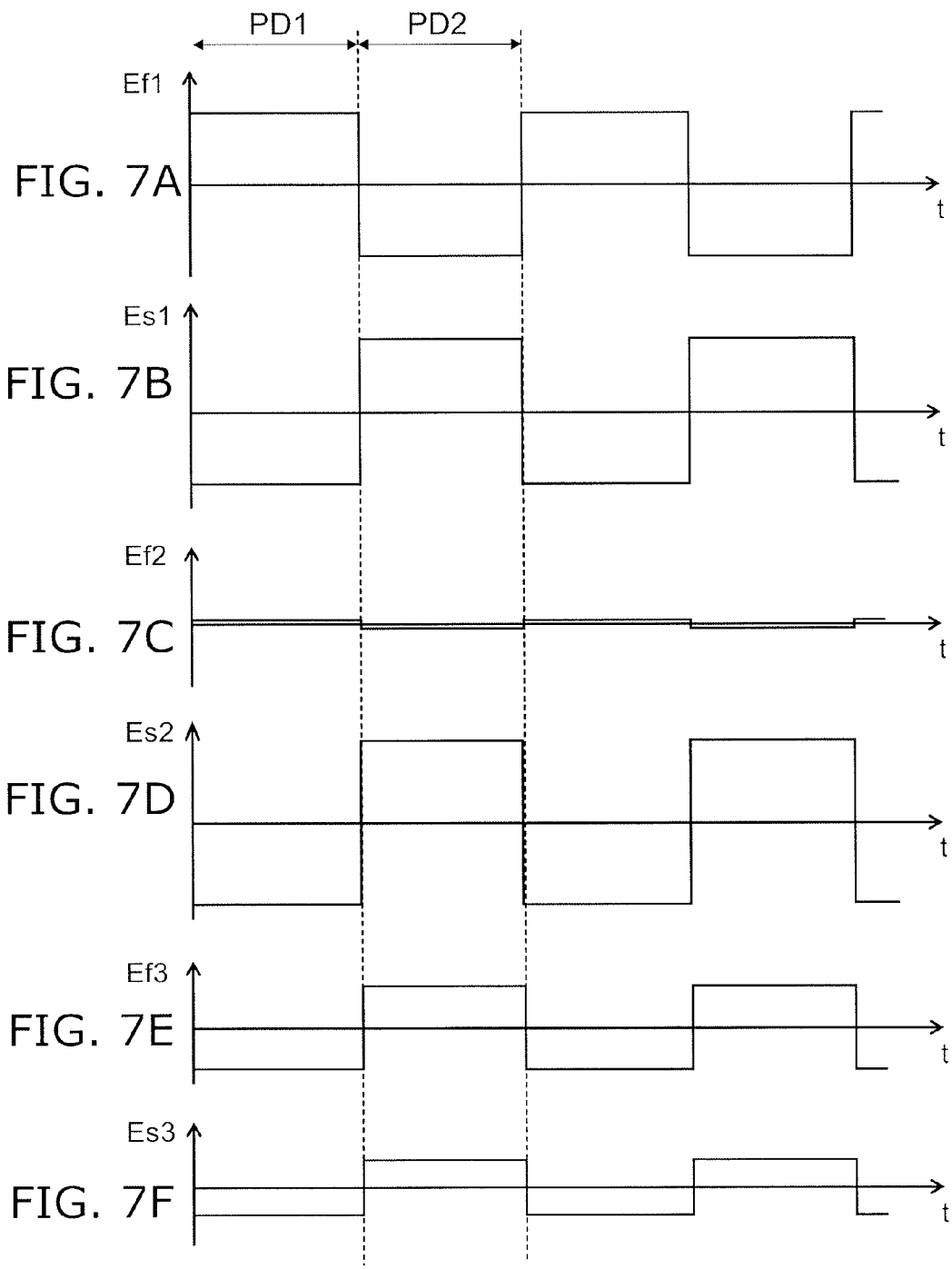

LIQUID CRYSTAL OPTICAL DEVICE AND DISPLAY APPARATUS

CROSS-REFERENCE TO RELATED APPLICATIONS

This application is based upon and claims the benefit of priority from Japanese Patent Application No. 2012-230060, filed on Oct. 17, 2012; the entire contents of which are incorporated herein by reference.

FIELD

Embodiments described herein relate generally to a liquid crystal optical device and a display apparatus.

BACKGROUND

There is a liquid crystal optical device including a liquid crystal optical unit that changes the distribution of the refractive index according to the application of a voltage by utilizing the birefringence of liquid crystal molecules. There is a display apparatus in which a liquid crystal optical device and an image display unit are combined. By changing the distribution of the refractive index of the liquid crystal optical unit, the display apparatus switches between a state in which the image displayed by the image display unit is caused to be incident on the eyes of a human viewer as displayed by the image display unit and a state in which the image displayed by the image display unit is caused to be incident on the eyes of the human viewer as multiple parallax images. Thereby, a two-dimensional image display operation and a three-dimensional image display operation are realized. High display quality is necessary for such a display apparatus.

BRIEF DESCRIPTION OF THE DRAWINGS

FIG. 7A to FIG. 7F are graphs showing other characteristics of the liquid crystal optical device and the display apparatus according to the first embodiment;

DETAILED DESCRIPTION

Figure 1:
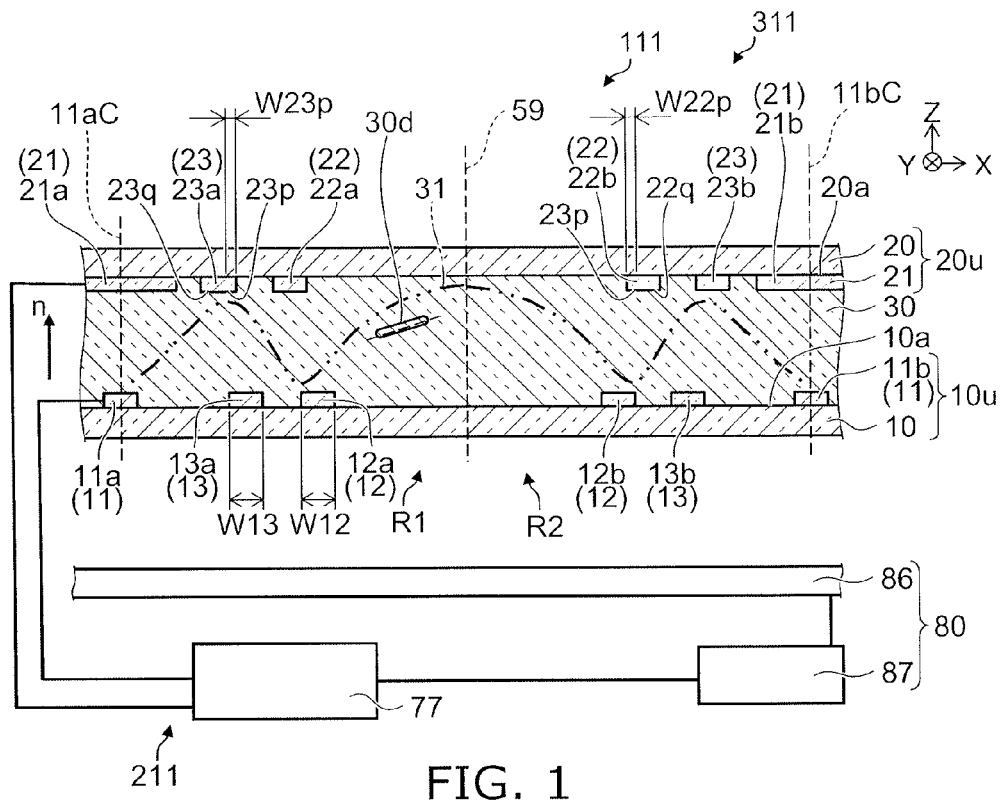
FIG. 1 is a schematic cross-sectional view showing a liquid crystal optical device and a display apparatus according to a first embodiment.

According to one embodiment, a liquid crystal optical device includes a liquid crystal optical unit and a drive unit. The liquid crystal optical unit includes a first substrate unit, a second substrate unit, and a liquid crystal layer. The first substrate unit includes a first substrate, a plurality of first electrodes, a second electrode, and a third electrode. The first substrate has a first major surface. The first electrodes are provided on the first major surface to extend in a first direction. The first electrodes are arranged in an intersecting direction intersecting the first direction. The second electrode is provided between the first electrodes on the first major surface to extend in the first direction. The third electrode is provided between the second electrode and one of the first electrodes on the first major surface to extend in the first direction. The second substrate unit includes a second substrate, a plurality of first opposing electrodes, a second opposing electrode, and a third opposing electrode. The second substrate has a second major surface facing the first major surface. The first opposing electrodes are provided on the second major surface to extend in the first direction. Each of the first opposing electrodes partly or wholly overlaps each of the first electrodes when projected onto a plane parallel to the first major surface. The second opposing electrode is provided on the second major surface to extend in the first direction. The second opposing electrode is separated from the first opposing electrodes in the intersecting direction. The second opposing electrode partly or wholly overlaps the second electrode when projected onto the plane. The third opposing electrode is provided on the second major surface to extend in the first direction. The third opposing electrode is separated from the first opposing electrodes and the second opposing electrode in the intersecting direction. The third opposing electrode partly or wholly overlaps the third electrode when projected onto the plane. The liquid crystal layer is provided between the first substrate unit and the second substrate unit. The drive unit is configured to implement a first operation including subjecting the first electrodes to a first potential, subjecting the second electrode to a second potential, subjecting the third electrode to a third potential, subjecting the first opposing electrodes to a first opposing potential, subjecting the second opposing electrode to a second opposing potential, and subjecting the third opposing electrode to a third opposing potential. The second potential is not more than the first potential. The third potential is lower than the second potential. The first opposing potential is lower than the first potential. The second opposing potential is lower than the second potential. The third opposing potential is higher than the second opposing potential. The absolute value of the difference between the second potential and the second opposing potential is not more than the absolute value of the difference between the first potential and the first opposing potential. The absolute value of the difference between the third potential and the third opposing potential is less than the absolute value of the difference between the second potential and the second opposing potential.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic cross-sectional view showing a liquid crystal optical device and a display apparatus according to a first embodiment.

As shown in FIG. 1, the display apparatus 311 according to the embodiment includes the liquid crystal optical device 211 and an image display unit 80. The image display unit 80 may include any display apparatus. For example, a liquid crystal display apparatus, an organic EL display apparatus, a plasma display, etc., may be used.

The liquid crystal optical device 211 includes a liquid crystal optical unit 111 and a drive unit 77.

The liquid crystal optical unit 111 includes a first substrate unit 10u, a second substrate unit 20u, and a liquid crystal layer 30.

The first substrate unit 10u includes a first substrate 10, multiple first electrodes 11, multiple second electrodes 12, and multiple third electrodes 13.

The first substrate 10 has a first major surface 10a. The multiple first electrodes 11 are provided on the first major surface 10a. Each of the multiple first electrodes 11 extends in a first direction. The multiple first electrodes 11 are arranged in an intersecting direction intersecting the first direction. FIG. 1 shows two of the multiple first electrodes 11. The number of the multiple first electrodes 11 is arbitrary.

The first direction is taken as a Y-axis direction. A direction parallel to the major surface 10a and perpendicular to the Y-axis direction is taken as an X-axis direction. A direction perpendicular to the X-axis direction and the Y-axis direction is taken as a Z-axis direction.

The multiple first electrodes 11 are arranged along, for example, the X-axis direction.

Two most proximal first electrodes 11 of the multiple first electrodes 11 will now be focused upon. One of the two most proximal first electrodes 11 is taken as a first major electrode 11a. The other of the two most proximal first electrodes 11 is taken as a second major electrode 11b.

A central axis 59 is between the two most proximal first electrodes 11 (e.g., the first major electrode 11a and the second major electrode 11b). The central axis 59 is parallel to the Y-axis direction and passes through a midpoint of a line segment connecting a center 11aC in the X-axis direction of the first major electrode 11a to a center 11bC in the X-axis direction of the second major electrode 11b when projected onto the X-Y plane (a plane parallel to the first major surface 10a).

The region of the first major surface 10a between the central axis 59 and the first major electrode 11a which is the one of the two most proximal first electrodes 11 is taken as a first region R1. The region of the first major surface 10a between the central axis 59 and the second major electrode 11b which is the other of the two most proximal first electrodes 11 is taken as a second region R2. The direction from the first major electrode 11a toward the second major electrode 11b is taken to be the +X direction. The direction from the second major electrode 11b toward the first major electrode 11a corresponds to the −X direction.

The multiple second electrodes 12 are provided between the multiple first electrodes 11 on the first major surface 10a. The multiple second electrodes 12 extend in the Y-axis direction. One of the multiple second electrodes 12 is taken as a first sub electrode 12a. One other of the multiple second electrodes 12 is taken as a second sub electrode 12b. The first sub electrode 12a is provided in the first region R1 on the first major surface 10a. The first sub electrode 12a is disposed between the central axis 59 and the first major electrode 11a. The second sub electrode 12b is provided in the second region R2 on the first major surface 10a. The second sub electrode 12b is disposed between the central axis 59 and the second major electrode 11b.

The multiple third electrodes 13 are provided respectively in the spaces between the multiple first electrodes 11 and the multiple second electrodes 12 on the first major surface 10a. One of the multiple third electrodes 13 is taken as a third sub electrode 13a. One other of the multiple third electrodes 13 is taken as a fourth sub electrode 13b. The third sub electrode 13a is provided in the first region R1 on the first major surface 10a. The third sub electrode 13a is disposed between the first major electrode 11a and the first sub electrode 12a. The fourth sub electrode 13b is provided in the second region R2 on the first major surface 10a. The fourth sub electrode 13b is disposed between the second major electrode 11b and the second sub electrode 12b.

The second substrate unit 20u includes a second substrate 20, multiple first opposing electrodes 21, multiple second opposing electrodes 22, and multiple third opposing electrodes 23. The second substrate 20 has a second major surface 20a opposing the first major surface 10a.

The multiple first opposing electrodes 21 are provided on the second major surface 20a. The multiple first opposing electrodes 21 extend in the Y-axis direction. At least portions of the multiple first opposing electrodes 21 respectively overlap at least portions of the multiple first electrodes 11 when projected onto a plane (the X-Y plane) parallel to the first major surface 10a. Thus, each of the multiple first opposing electrodes 21 partly or wholly overlaps each of the multiple first electrodes 11 when projected onto the X-Y plane. One of the first opposing electrodes 21 overlapping the first major electrode 11a when projected onto the X-Y plane is taken as a first opposing major electrode 21a. One other of the first opposing electrodes 21 overlapping the second major electrode 11b when projected onto the X-Y plane is taken as a second opposing major electrode 21b.

The multiple second opposing electrodes 22 are provided on the second major surface 20a. The multiple second opposing electrodes 22 extend in the Y-axis direction. The multiple second opposing electrodes 22 are separated from the multiple first opposing electrodes in the X-axis direction. The multiple second opposing electrodes 22 respectively overlap at least portions of the multiple second electrodes 12 when projected onto the X-Y plane. Thus, each of the multiple second opposing electrodes 22 partly or wholly overlaps each of the multiple second electrodes 12 when projected onto the X-Y plane. One of the second opposing electrodes 22 overlapping the first sub electrode 12a when projected onto the X-Y plane is taken as a first opposing sub electrode 22a. One other of the second opposing electrodes 22 overlapping the second sub electrode 12b when projected onto the X-Y plane is taken as a second opposing sub electrode 22b.

The multiple third opposing electrodes 23 are provided on the second major surface 20*a*. The multiple third opposing electrodes 23 extend in the Y-axis direction. The multiple third opposing electrodes 23 are separated from the multiple first opposing electrodes 21 and the multiple second opposing electrodes 22 in the X-axis direction. The multiple third opposing electrodes 23 respectively overlap at least portions of the multiple third electrodes 13 when projected onto the X-Y plane. Thus, each of the multiple third opposing electrodes 23 partly or wholly overlaps each of the multiple third electrodes 13 when projected onto the X-Y plane. One of the third opposing electrodes 23 overlapping the third sub electrode 13*a* when projected onto the X-Y plane is taken as a third opposing sub electrode 23*a*. One other of the third opposing electrodes 23 overlapping the fourth sub electrode 13*b* when projected onto the X-Y plane is taken as a fourth opposing sub electrode 23*b*.

The first substrate 10, the first electrodes 11, the second electrodes 12, the third electrodes 13, the second substrate 20, the first opposing electrodes 21, the second opposing electrodes 22, and the third opposing electrodes 23 are transmissive to light. Specifically, these are components transparent.

The first substrate 10 and the second substrate 20 may include, for example, a transparent material such as glass, a resin, etc. The first substrate 10 and the second substrate 20 have plate configurations or sheet configurations. The thicknesses of the first substrate 10 and the second substrate 20 are, for example, not less than 50 micrometers (μm) and not more than 2000 μm. However, the thicknesses are arbitrary.

The first electrodes 11, the second electrodes 12, the third electrodes 13, the first opposing electrodes 21, the second opposing electrodes 22, and the third opposing electrodes 23 include, for example, an oxide including at least one (one type) of element selected from the group consisting of In, Sn, Zn, and Ti. These electrodes may include, for example, ITO. For example, at least one selected from $In_2O_3$ and $SnO_3$ may be used. The thicknesses of these electrodes are, for example, about 200 nanometers (nm) (e.g., not less than 100 nm and not more than 350 nm). The thicknesses of the electrodes are set to be, for example, thicknesses to obtain a high transmittance with respect to visible light.

The disposition pitch of the first electrodes 11 (the distance between X-axis direction centers of the two most proximal first electrodes 11) is, for example, not less than 10 μm and not more than 1000 μm. The disposition pitch is set to match the desired specifications (the characteristics of the gradient index lens described below). The lengths (the widths) along the X-axis direction of the first electrodes 11, the second electrodes 12, the third electrodes 13, the first opposing electrodes 21, the second opposing electrodes 22, and the third opposing electrodes 23 are, for example, not less than 5 μm and not more than 30 μm. The widths of the first opposing electrodes 21 may be substantially the same as or different from the widths of the first electrodes 11. The widths of the second opposing electrodes 22 may be substantially the same as or different from the widths of the second electrodes 12. The widths of the third opposing electrodes 23 may be substantially the same as or different from the widths of the third electrodes 13.

The length of the space between the first major electrode 11*a* and the third sub electrode 13*a* along the X-axis direction is, for example, not less than 5 μm and not more than 30 μm. The length of the space between the first sub electrode 12*a* and the third sub electrode 13*a* along the X-axis direction is, for example, not less than 5 μm and not more than 30 μm. The length of the space between the first opposing major electrode 21*a* and the third opposing sub electrode 23*a* along the X-axis direction is, for example, not less than 5 μm and not more than 30 μm. The length of the space between the first opposing sub electrode 22*a* and the third opposing sub electrode 23*a* along the X-axis direction is, for example, not less than 5 μm and not more than 30 μm.

The liquid crystal layer 30 is provided between the first substrate unit 10*u* and the second substrate unit 20*u*. The liquid crystal layer 30 includes a liquid crystal material. The liquid crystal material may include a nematic liquid crystal (having a nematic phase at the temperature of use of the liquid crystal optical unit 111). The liquid crystal material has a positive dielectric anisotropy or a negative dielectric anisotropy. In the case of the positive dielectric anisotropy, the initial alignment of the liquid crystal of the liquid crystal layer 30 (the alignment when a voltage is not applied to the liquid crystal layer 30) is, for example, a horizontal alignment. In the case of the negative dielectric anisotropy, the initial alignment of the liquid crystal of the liquid crystal layer 30 is a vertical alignment.

The length (the thickness) of the liquid crystal layer 30 along the Z-axis direction is, for example, not less than 20 μm and not more than 50 μm. In the example, the thickness of the liquid crystal layer 30 is 30 μm. In other words, the thickness of the liquid crystal layer 30 is the distance along the Z-axis direction between the first substrate unit 10*u* and the second substrate unit 20*u*.

The alignment of the liquid crystal of the liquid crystal layer 30 may have a pretilt. In the pretilt, for example, a director 30*d* of the liquid crystal is oriented from the first substrate unit 10*u* toward the second substrate unit 20*u* along the +X direction from the first major electrode 11*a* toward the second major electrode 11*b*.

The pretilt angle is the angle between the X-Y plane and the director 30*d* (the axis of the liquid crystal molecules in the long-axis direction) of the liquid crystal. In the case of the horizontal alignment, the pretilt angle is, for example, less than 45° and greater than 0°. In the case of the vertical alignment, the pretilt angle is, for example, less than 90° and greater than 45°.

For convenience in the specification, the horizontal alignment refers to the case where the pretilt angle is less than 45°; and for convenience, the vertical alignment refers to the case where the pretilt angle is greater than 45°.

For example, the direction of the pretilt can be determined by a crystal rotation method, etc. Also, the direction of the pretilt can be determined by changing the alignment of the liquid crystal by applying a voltage to the liquid crystal layer 30 and by observing the optical characteristics of the liquid crystal layer 30 at this time.

In the case where alignment processing of the first substrate unit 10*u* is performed by, for example, rubbing, etc., the direction of the alignment processing is along the +X direction. In the example, the direction of the alignment processing of the first substrate unit 10*u* is, for example, the +X direction.

The axis of the director 30*d* may be parallel to the +X direction or intersecting the +X direction when the director 30*d* of the liquid crystal is projected onto the X-Y plane. The direction of the pretilt has a +X direction component when the direction of the pretilt is projected onto the X axis.

The alignment direction of the liquid crystal layer 30 proximal to the second substrate unit 20*u* is antiparallel to the alignment direction of the liquid crystal layer 30 proximal to the first substrate unit 10*u*. In the example, the direction of the alignment processing of the second substrate unit 20*u* is the −X direction. In other words, the initial alignment is not a splay alignment.

The first substrate unit 10u may further include an alignment film (not shown). The multiple first electrodes 11, the multiple second electrodes 12, and the multiple third electrodes 13 are disposed between the first substrate 10 and the alignment film of the first substrate unit 10u. The second substrate unit 20u may further include an alignment film (not shown). The multiple first opposing electrodes 21, the multiple second opposing electrodes 22, and the multiple third opposing electrodes 23 are disposed between the second substrate 20 and the alignment film of the second substrate unit 20u. These alignment films may include, for example, polyimide. The initial alignment of the liquid crystal layer 30 is obtained by, for example, performing rubbing of the alignment films. The direction of the rubbing of the first substrate unit 10u is antiparallel to the rubbing direction of the second substrate unit 20u. The initial alignment may be obtained by performing light irradiation of the alignment films.

The case will now be described where the dielectric anisotropy of the liquid crystal included in the liquid crystal layer 30 is positive and the initial alignment is the horizontal alignment.

The liquid crystal alignment of the liquid crystal layer 30 is changed by applying voltages between the first electrode 11 and the first opposing electrode 21, between the second electrode 12 and the second opposing electrode 22, and between the third electrode 13 and the third opposing electrode 23. A refractive index distribution is formed in the liquid crystal layer 30 according to this change; and the travel direction of the light that is incident on the liquid crystal optical unit 111 is changed by the refractive index distribution. The change of the travel direction of the light is mainly based on the refraction effect.

The image display unit 80 includes a display unit 86. The display unit 86 is stacked with the liquid crystal optical unit 111. The display unit 86 emits light including image information to be incident on the liquid crystal layer 30. The image display unit 80 may further include a display control unit 87 that controls the display unit 86. The display unit 86 produces light that is modulated based on the signal supplied from the display control unit 87 to the display unit 86. For example, the display unit 86 emits light that includes multiple parallax images. As described below, the liquid crystal optical unit 111 has an operating state in which the optical path is modified, and an operating state in which the optical path is substantially not modified. For example, the display apparatus 311 provides a three-dimensional image display by the light being incident on the liquid crystal optical unit 111 in the operating state in which the optical path is modified. The display apparatus 311 provides, for example, a two-dimensional image display in the operating state in which, for example, the optical path is substantially not modified.

The drive unit 77 may be connected to the display control unit 87 by a wired or wireless method (an electrical method, an optical method, etc.). The display apparatus 311 may further include a control unit (not shown) that controls the drive unit 77 and the display control unit 87.

The drive unit 77 is electrically connected to the multiple first electrodes 11, the multiple second electrodes 12, the multiple third electrodes 13, the multiple first opposing electrodes 21, the multiple second opposing electrodes 22, and the multiple third opposing electrodes 23. For easier viewing of the drawing in FIG. 1, a portion of the interconnects between the drive unit 77 and the electrodes is not shown.

Figure 2:
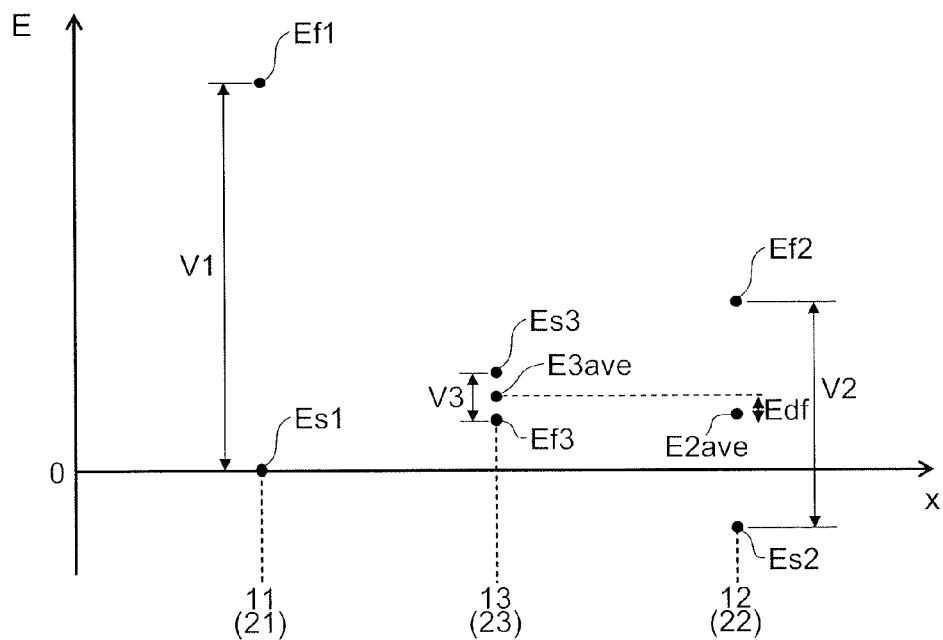
FIG. 2 is a graph showing a characteristic of the liquid crystal optical device and the display apparatus according to the first embodiment.

FIG. 2 is a graph showing a characteristic of the liquid crystal optical device and the display apparatus according to the first embodiment.

FIG. 2 is a graph showing the operating characteristic of the drive unit 77. In FIG. 2, the horizontal axis is the X-axis direction position x; and the vertical axis is a potential E. In FIG. 2, the portion of 0 V of the potential E is the ground potential (the reference potential) of the circuit of the display apparatus 311. The ground potential of the circuit of the display apparatus 311 may be substantially the same as the potential of the earth or may be different from the potential of the earth.

As shown in FIG. 2, the drive unit 77 implements an operation including subjecting the first electrodes 11 to a first potential Ef1, subjecting the second electrodes 12 to a second potential Ef2 that is not more than the first potential Ef1, subjecting the third electrodes 13 to a third potential Ef3 that is lower than the second potential Ef2, subjecting the first opposing electrodes 21 to a first opposing potential Es1 that is lower than the first potential Ef1, subjecting the second opposing electrodes 22 to a second opposing potential Es2 that is lower than the second potential Ef2, and subjecting the third opposing electrodes 23 to a third opposing potential Es3 that is higher than the second opposing potential Es2. In the specification of the application, the reference for determining whether the potential is high or low is the direction in which the current flows. For example, in the case of the first potential Ef1 and the first opposing potential Es1, the current flows from the first potential Ef1 toward the first opposing potential Es1.

By subjecting the potentials of the electrodes as recited above, the drive unit 77 applies a first voltage V1 between the first electrode 11 and the first opposing electrode 21, applies a second voltage V2 that is not more than the first voltage V1 between the second electrode 12 and the second opposing electrode 22, and applies a third voltage V3 that is less than the second voltage V2 between the third electrode 13 and the third opposing electrode 23.

The second potential Ef2 may be substantially the same as the first potential Ef1. The second opposing potential Es2 may be substantially the same as the first opposing potential Es1. The second voltage V2 may be substantially the same as, for example, the first voltage V1. The third opposing potential Es3 may be substantially the same as, for example, the third potential Ef3. In other words, the third voltage V3 may be zero volts. The third voltage V3 is, for example, not more than 0.5 V. For convenience in the specification, the state in which the potential is the same (is zero volts) between two electrodes also is taken to be included in the state in which the voltage is applied.

The first voltage V1 is, more specifically, the voltage between the first major electrode 11a and the first opposing major electrode 21a and the voltage between the second major electrode 11b and the second opposing major electrode 21b. The second voltage V2 is, more specifically, the voltage between the first sub electrode 12a and the first opposing sub electrode 22a and the voltage between the second sub electrode 12b and the second opposing sub electrode 22b. The third voltage V3 is, more specifically, the voltage between the third sub electrode 13a and the third opposing sub electrode 23a and the voltage between the fourth sub electrode 13b and the fourth opposing sub electrode 23b. The first voltage V1 is the absolute value of the difference between the first potential Ef1 and the first opposing potential Es1. The second voltage V2 is the absolute value of the difference between the second potential Ef2 and the second opposing potential Es2. The third voltage V3 is the absolute value of the difference between the third potential Ef3 and the third opposing potential Es3.

The first to third voltages V1 to V3 may be direct-current voltages or alternating current voltages. For example, the polarities of the first to third voltages V1 to V3 may change periodically. For example, the potentials of the first to third opposing electrodes 21 to 23 may be fixed and the potentials of the first to third electrodes 11 to 13 may be changed as alternating current. The potentials of the first to third opposing electrodes 21 to 23 may be changed periodically; and the potentials of the first to third electrodes 11 to 13 may be changed in conjunction with the change of the polarity of the potentials of the first to third opposing electrodes 21 to 23 but with a reverse polarity. In other words, common inversion driving may be performed. Thereby, the power supply voltage of the drive circuit can be reduced; and the breakdown voltage specifications of the drive IC are relaxed. In the example hereinbelow, the first to third voltages V1 to V3 are direct-current voltages.

In the example, the polarity of the third opposing potential Es3 is the same as the polarity of the first potential Ef1. On the other hand, the polarity of the second opposing potential Es2 is the reverse polarity with respect to the polarity of the first potential Ef1 and the polarity of the third opposing potential Es3. For example, in the case where the first potential Ef1 and the third opposing potential Es3 are positive potentials, the second opposing potential Es2 is a negative potential.

For example, the drive unit 77 sets the potentials to satisfy the condition $|(Ef2+Es2)/2-(Ef3+Es3)/2|<2|Ef3-Es3|.$ Because |Ef3−Es3| is the potential difference that forms the jump apex, it is desirable for |Ef3−Es3| to be a potential difference at which the liquid crystal does not tilt upward.

It is favorable for the drive unit 77 to set the potentials to further satisfy the condition $|(Ef2+Es2)/2-(Ef3+Es3)/2|<|Ef2-Es2|.$ For example, it is favorable for the drive unit 77 to set the potentials to satisfy the condition $|(Ef2+Es2)/2-(Ef3+Es3)/2|<|Ef3-Es3|.$ For example, the drive unit 77 sets the potentials to satisfy the condition $|(Ef2+Es2)/2-(Ef3+Es3)/2|<0.5\ V.$ Thus, the drive unit 77 causes the absolute value of a difference Edf between a potential $E2_{ave}$ that is the average of the second potential Ef2 and the second opposing potential Es2 and a potential $E3_{ave}$ that is the average of the third potential Ef3 and the third opposing potential Es3 to be less than twice the potential difference (the third voltage V3) between the third potential Ef3 and the third opposing potential Es3. The drive unit 77 causes the absolute value of the difference Edf between the potential $E2_{ave}$ that is the average of the second potential Ef2 and the second opposing potential Es2 and the potential $E3_{ave}$ that is the average of the third potential Ef3 and the third opposing potential Es3 to be less than the potential difference (the second voltage V2) between the second potential Ef2 and the second opposing potential Es2.

When the absolute value of the difference Edf between the potential $E2_{ave}$ that is the average of the second potential Ef2 and the second opposing potential Es2 and the potential $E3_{ave}$ that is the average of the third potential Ef3 and the third opposing potential Es3 is large, for example, a potential difference occurs in the horizontal direction of the liquid crystal at the apex portion of the jump; and tilting of the liquid crystal director occurs. Therefore, the refractive index value of the jump apex portion decreases; and the abrupt tilt of the jump of the refractive index does not occur easily in the portion of the liquid crystal layer 30 between the second electrode 12 and the third electrode 13. Thereby, the stray light range widens; and the concentrating ability degrades.

The average potential $E2_{ave}$ is, for example, the potential at the position of the Z-axis direction center between the second potential Ef2 and the second opposing potential Es2. The average potential $E3_{ave}$ is, for example, the potential at the position of the Z-axis direction center between the third potential Ef3 and the third opposing potential Es3. For example, the drive unit 77 causes the potential difference between the second electrode 12 and the third electrode 13 at the position of the Z-axis direction center of the liquid crystal layer 30 to be less than the second voltage V2 and the third voltage V3. In other words, the electric field in the lateral direction (the direction parallel to the X-Y plane) at the position of the Z-axis direction center of the liquid crystal layer 30 is caused to be less than the electric field in the vertical direction (the Z-axis direction).

For example, the drive unit 77 sets the first potential Ef1 to be 7 V, sets the second potential Ef2 to be 3 V, sets the third potential Ef3 to be 1 V, sets the first opposing potential Es1 to be 0 V, sets the second opposing potential Es2 to be −1 V, and sets the third opposing potential Es3 to be 1.5 V. Thereby, the electrodes are set to have potentials that satisfy the condition recited above. In the example, the third opposing potential Es3 is higher than the third potential Ef3. The third opposing potential Es3 may be lower than the third potential Ef3 or may be substantially the same as the third potential Ef3. The first potential Ef1 is, for example, not less than 4 V and not more than 12 V. The second potential Ef2 is, for example, not less than 2.5 V and not more than 4 V. The third potential Ef3 is, for example, not less than 0.5 V and not more than 1.5 V. The first opposing potential Es1 is, for example, not less than 0 V and not more than 0.5 V. The second opposing potential Es2 is, for example, not less than −1 V and not more than 0 V. The third opposing potential Es3 is, for example, not less than 1 V and not more than 2 V.

In the case where the pretilt angle of the liquid crystal layer 30 is relatively small (e.g., not more than 10 degrees), a threshold voltage Vth relating to the change of the liquid crystal alignment of the liquid crystal layer 30 is relatively distinct. In such a case, for example, the first to third voltages V1 to V3 are set to be greater than the threshold voltage Vth. The liquid crystal alignment of the liquid crystal layer 30 is changed by the application of the first to third voltages V1 to V3.

An alignment in which the tilt angle of the liquid crystal is large (e.g., the vertical alignment) is formed in the liquid crystal layer 30 in the region between the first electrode 11 and the first opposing electrode 21 where the first voltage V1 is applied and the region between the second electrode 12 and the second opposing electrode 22 where the second voltage V2 is applied. The effective refractive index of these regions approaches, for example, the refractive index ($n_o$) for ordinary light.

On the other hand, the initial alignment (e.g., the horizontal alignment) or an alignment that is near the initial alignment is formed in the liquid crystal layer 30 in the region between the third electrode 13 and the third opposing electrode 23 where the third voltage V3 is applied. The refractive index of these regions for the light that vibrates in the X-axis direction approaches the refractive index ($n_e$) for extraordinary light. A voltage is not applied along the Z-axis direction in the region between the first sub electrode 12a and the second sub electrode 12b. Therefore, the initial alignment or an alignment near the initial alignment is formed also in the liquid crystal layer 30 of this region. Thereby, a refractive index distribution 31 is formed in the liquid crystal layer 30.

In the refractive index distribution 31, for example, the change of the refractive index is not less than about 20% and not more than about 80% of the difference between the refractive index for extraordinary light and the refractive index for ordinary light. In the example, for example, the refractive index distribution 31 has a configuration corresponding to the distribution of the thickness of a Fresnel lens. The liquid crystal optical unit 111 functions as a liquid crystal GRIN lens (Gradient Index lens) in which the refractive index changes in the plane. A lens array that has optical characteristics having a lenticular configuration is formed in the liquid crystal optical unit 111. In the example, the refractive index distribution 31 is formed in the liquid crystal layer 30 in a lens array configuration in which Fresnel lenses extending along the Y-axis direction are multiply arranged in the X-axis direction. The configuration of the refractive index distribution 31 is not limited to a Fresnel lens-like configuration and may be, for example, a convex lens configuration, a prism configuration, etc.

In the refractive index distribution 31, the position of the central axis 59 corresponds to the position of the lens center; and the positions of the first major electrode 11a and the second major electrode 11b correspond to the positions of the lens ends.

For example, in the liquid crystal optical unit 111, the operating state in which the optical path is modified is formed when the first to third voltages V1 to V3 are applied; and the operating state in which the optical path is substantially not modified is obtained when the first to third voltages V1 to V3 are not applied.

Figure 3A:
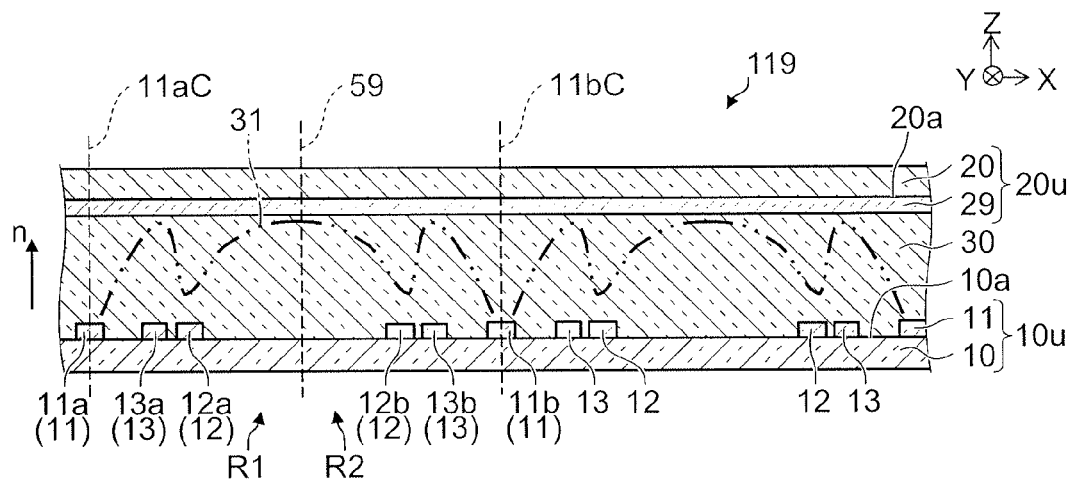
FIG. 3A and FIG. 3B are schematic views showing a liquid crystal optical unit of a reference example.
Figure 3B:
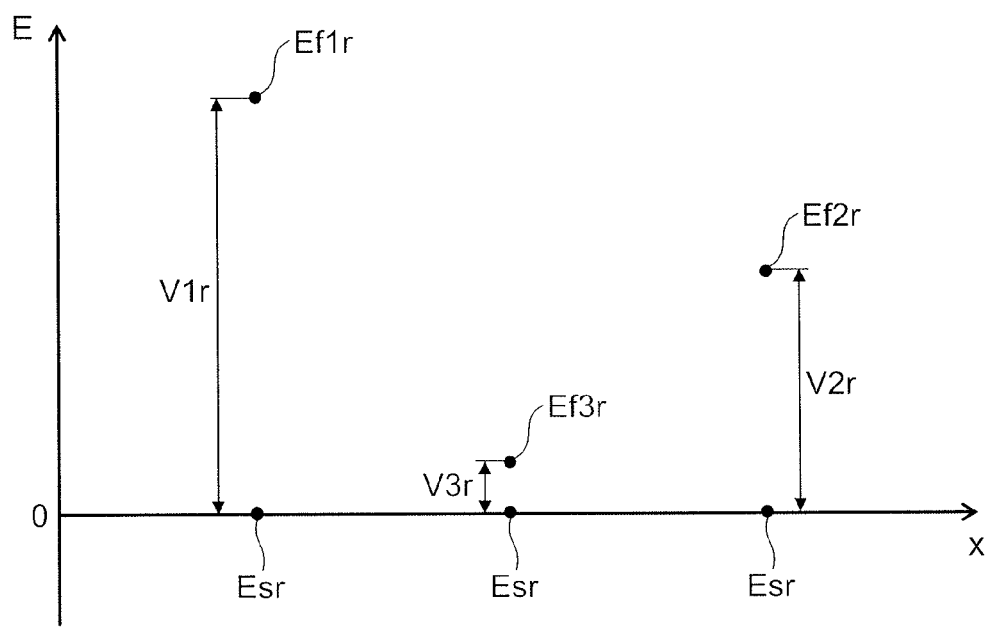

FIG. 3A and FIG. 3B are schematic views showing a liquid crystal optical unit of a reference example.

FIG. 3A is a schematic cross-sectional view showing the liquid crystal optical unit 119 of the reference example. FIG. 3B is a graph showing a characteristic of the liquid crystal optical unit 119 of the reference example. In FIG. 3B, the horizontal axis is the X-axis direction position x; and the vertical axis is the potential E.

In the liquid crystal optical unit 119 as shown in FIG. 3A, the second substrate unit 20u includes one opposing electrode 29 that opposes each of the multiple first electrodes 11, the multiple second electrodes 12, and the multiple third electrodes 13.

As shown in FIG. 3B, the opposing electrode 29 is set to have a potential Esr. The potential Esr is set to be, for example, the ground potential. In other words, in the liquid crystal optical unit 119, the potential that is set on the second substrate unit 20u side is substantially constant for the portions opposing the first electrodes 11, the portions opposing the second electrodes 12, and the portions opposing the third electrodes 13.

In the liquid crystal optical unit 119, a voltage V1r that is substantially the same as the first voltage V1 is applied between the opposing electrode 29 and the first electrodes 11, a voltage V2r that is substantially the same as the second voltage V2 is applied between the opposing electrode 29 and the second electrodes 12, and a voltage V3r that is substantially the same as the third voltage V3 is applied between the opposing electrode 29 and the third electrodes 13 by subjecting the first electrodes 11 to a potential Ef1r, subjecting the second electrodes 12 to a potential Ef2r, and subjecting the third electrodes 13 to a potential Ef3r. For example, in the example, the potential Ef1r is set to be 7 V; the potential Ef2r is set to be 4 V; and the potential Ef3r is set to be 0.5 V.

To obtain an appropriate refractive index difference between the region between the first electrode 11 and the opposing electrode 29 and the region between the third electrode 13 and the opposing electrode 29 in the liquid crystal optical unit 119, it is necessary to set the voltage V1r to be greater than the voltage V3r by, for example, not less than 5 V. Similarly, to obtain an appropriate refractive index difference between the region between the second electrode 12 and the opposing electrode 29 and the region between the third electrode 13 and the opposing electrode 29, it is necessary to set the voltage V2r to be greater than the voltage V3r by, for example, not less than 2.5 V.

However, in the liquid crystal optical unit 119, as the voltage V1r exceeds the voltage V3r, the potential difference between the potential Ef1r and the potential Ef3r increases and the electric field between the first electrode 11 and the third electrode 13 becomes strong. As the voltage V2r exceeds the voltage V3r, the potential difference between the potential Ef2r and the potential Ef3r increases and the electric field between the second electrode 12 and the third electrode 13 becomes strong. Then, the tilt angle of the liquid crystal in the region between the third electrode 13 and the third opposing electrode 23 becomes undesirably large (undesirably approaches the vertical alignment) due to the electric field between the first electrode 11 and the third electrode 13 and the electric field between the second electrode 12 and the third electrode 13.

Thus, due to the effects of the electric field between the first electrode 11 and the third electrode 13 and the electric field between the second electrode 12 and the third electrode 13 in the liquid crystal optical unit 119, it is difficult to obtain an appropriate refractive index difference in the liquid crystal layer 30 even in the case where the voltage V1r is set to be greater than the voltage V3r and the voltage V2r is set to be greater than the voltage V3r. In other words, it is difficult to obtain the refractive index distribution 31 having an appropriate configuration in the liquid crystal optical unit 119. Such unintended deformation of the refractive index distribution 31 causes, for example, crosstalk in the three-dimensional image display; and the display quality of the three-dimensional image display undesirably decreases.

Conversely, in the liquid crystal optical device 211 and the display apparatus 311 according to the embodiment, the multiple first opposing electrodes 21, the multiple second opposing electrodes 22, and the multiple third opposing electrodes 23 are provided in the second substrate unit 20u of the liquid crystal optical unit 111; and the third opposing potential Es3 of the third opposing electrodes 23 is set to be higher than the second opposing potential Es2 of the second opposing electrodes 22. Thereby, even in the case where the first voltage V1 is set to be greater than the third voltage V3, the potential difference between the first potential Ef1 and the third potential Ef3 can be suppressed. Even in the case where the second voltage V2 is set to be greater than the third voltage V3, the potential difference between the second potential Ef2 and the third potential Ef3 can be suppressed.

For example, the difference Edf between the potential $E2_{ave}$ that is the average of the second potential Ef2 and the second opposing potential Es2 and the potential $E3_{ave}$ that is the average of the third potential Ef3 and the third opposing potential Es3 can be suppressed. The difference between the potential that is the average of the first potential Ef1 and the first opposing potential Es1 and the potential $E3_{ave}$ that is the average of the third potential Ef3 and the third opposing potential Es3 can be suppressed.

In other words, the electric field between the first electrode 11 and the third electrode 13 can be suppressed while applying the first voltage V1 and the third voltage V3 that have appropriate magnitudes. The electric field between the second electrode 12 and the third electrode 13 can be suppressed while applying the second voltage V2 and the third voltage V3 that have appropriate magnitudes.

Thus, in the liquid crystal optical device 211 and the display apparatus 311 according to the embodiment, the effects of the electric field between the first electrode 11 and the third electrode 13 and the electric field between the second electrode 12 and the third electrode 13 can be suppressed; and the appropriate refractive index difference in the liquid crystal layer 30 can be obtained. The refractive index distribution 31 having an appropriate configuration can be obtained in the liquid crystal optical device 211 and the display apparatus 311. In other words, in the liquid crystal optical device 211 and the display apparatus 311, high display quality of the three-dimensional image display can be obtained.

The drive unit 77 sets the polarity of the second opposing potential Es2 to be the reverse polarity with respect to the polarity of the first potential Ef1 and the polarity of the third opposing potential Es3. Thereby, for example, the potential difference between the second potential Ef2 and the third potential Ef3 can be suppressed more appropriately.

The drive unit 77 causes the absolute value of the difference Edf between the potential $E2_{ave}$ that is the average of the second potential Ef2 and the second opposing potential Es2 and the potential $E3_{ave}$ that is the average of the third potential Ef3 and the third opposing potential Es3 to be less than the potential difference between the second potential Ef2 and the second opposing potential Es2 and the potential difference between the third potential Ef3 and the third opposing potential Es3. Thereby, for example, the potential difference between the second potential Ef2 and the third potential Ef3 can be suppressed more appropriately.

Figure 4:
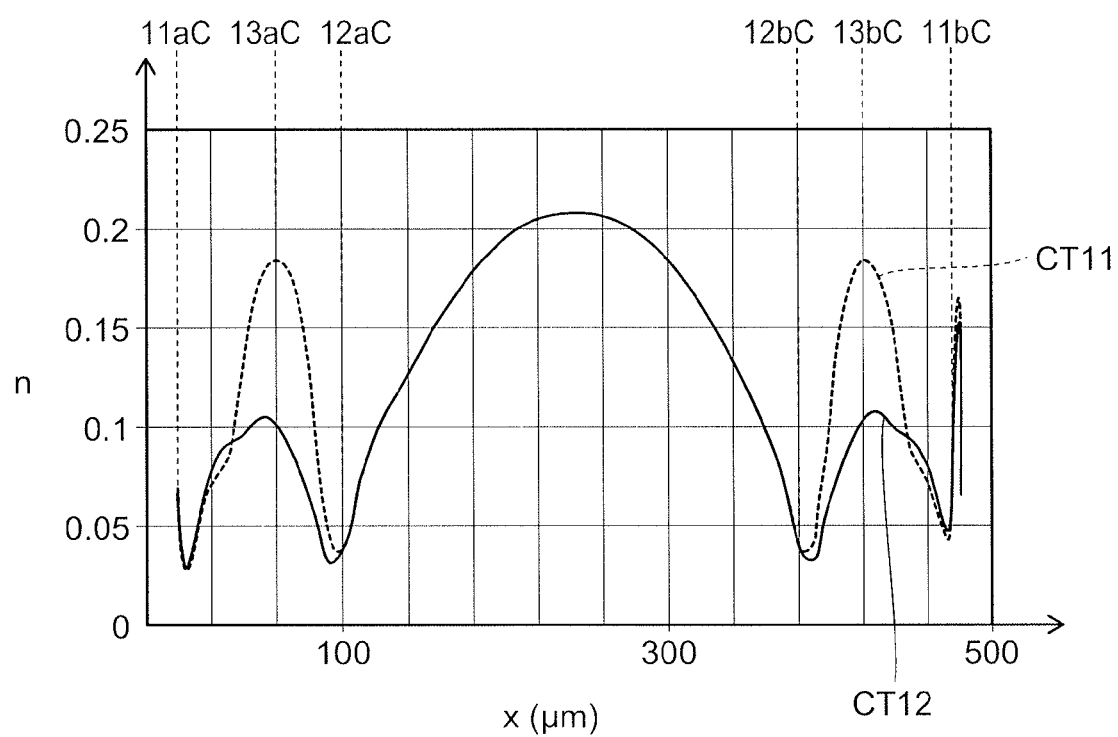
FIG. 4 is a graph showing characteristics of the liquid crystal optical device and the display apparatus according to the first embodiment.

FIG. 4 is a graph showing characteristics of the liquid crystal optical device and the display apparatus according to the first embodiment.

FIG. 4 is a graph showing results of an optical simulation of the refractive index anisotropy of the liquid crystal layer 30. In FIG. 4, the horizontal axis is the X-axis direction position x (μm); and the vertical axis is the refractive index anisotropy n of the liquid crystal layer 30. FIG. 4 shows a characteristic CT11 and a characteristic CT12.

The characteristic CT11 is the simulation result of the liquid crystal optical unit 111 in the case where the first potential Ef1 is set to be 7 V, the second potential Ef2 is set to be 3 V, the third potential Ef3 is set to be 1 V, the first opposing potential Es1 is set to be 0 V, the second opposing potential Es2 is set to be −1 V, and the third opposing potential Es3 is set to be 1.5 V as described above.

The characteristic CT12 is the simulation result of the liquid crystal optical unit 119 in the case where the potential Ef1r is set to be 7 V, the potential Ef2r is set to be 4 V, the potential Ef3r is set to be 0.5 V, and the potential Esr is set to be 0 V as described above.

FIG. 4 shows the center 11aC of the first major electrode 11a in the X-axis direction, the center 11bC of the second major electrode 11b in the X-axis direction, a center 12aC of the first sub electrode 12a in the X-axis direction, a center 12bC of the second sub electrode 12b in the X-axis direction, a center 13aC of the third sub electrode 13a in the X-axis direction, and a center 13bC of the fourth sub electrode 13b in the X-axis direction.

As shown in FIG. 4, the refractive index anisotropy of the characteristic CT11 is higher than the refractive index anisotropy of the characteristic CT12 at the position of the center 13aC of the third sub electrode 13a. Similarly, the refractive index anisotropy of the characteristic CT11 is higher than the refractive index anisotropy of the characteristic CT12 at the position of the center 13bC of the fourth sub electrode 13b. Thus, compared to the liquid crystal optical unit 119 in the liquid crystal optical unit 111, a good refractive index difference can be obtained between the center 11aC and the center 13aC, between the center 12aC and the center 13aC, between the center 11bC and the center 13bC, and between the center 12bC and the center 13bC.

The third opposing electrode 23 has a superimposed portion 23p overlapping the third electrode 13 and a non-superimposed portion 23q not overlapping the third electrode 13 when projected onto the X-Y plane. The non-superimposed portion 23q is positioned between the first electrode 11 and the third electrode 13 when projected onto the X-Y plane. A width (a length along the X-axis direction) W23p of the superimposed portion 23p is, for example, greater than 0 and not more than ½ of a width W13 of the third electrode 13.

Figure 5A:
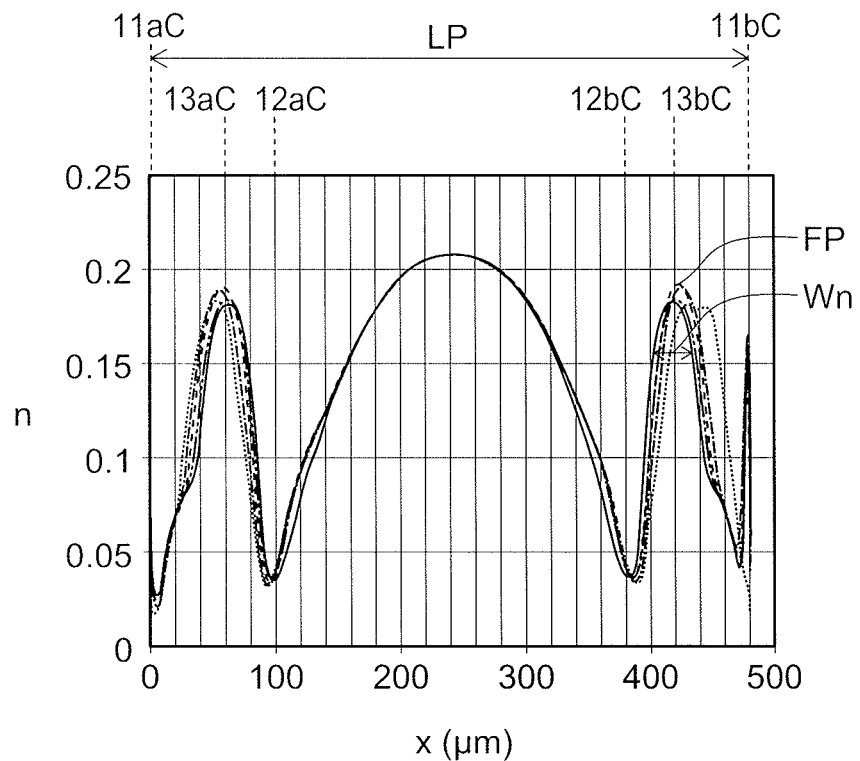
FIG. 5A and FIG. 5B are graphs showing characteristics of the liquid crystal optical device and the display apparatus according to the first embodiment.
Figure 5B:
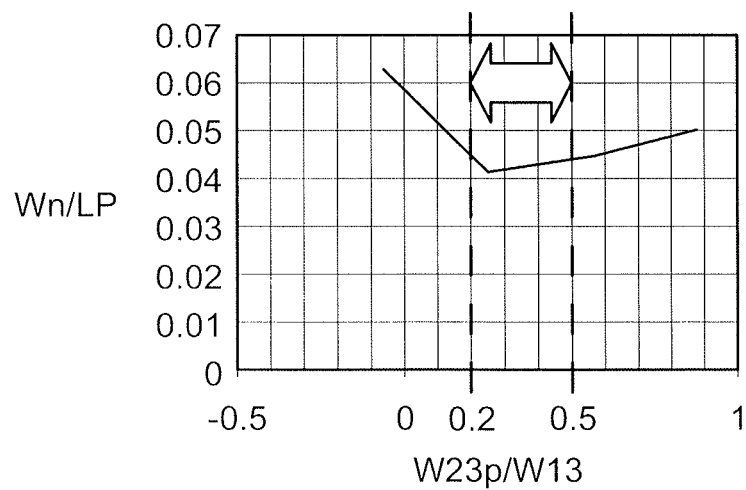

FIG. 5A and FIG. 5B are graphs showing characteristics of the liquid crystal optical device and the display apparatus according to the first embodiment.

FIG. 5A is a graph showing results of an optical simulation of the refractive index anisotropy of the liquid crystal layer 30 when changing the width W23p of the superimposed portion 23p (the amount of the overlap between the third electrode 13 and the third opposing electrode 23). In FIG. 5A, the horizontal axis is the X-axis direction position x (μm); and the vertical axis is the refractive index anisotropy n of the liquid crystal layer 30.

In the simulation, five calculation results are calculated for a proportion W23p/W13 of the width W23p of the superimposed portion 23p to the width W13 of the third electrode 13 of 0.06, 0.25, 0.56, 0.81, and 0.87. The proportion W23p/W13 is 1.00 in the case where the third opposing electrode 23 opposes the entire third electrode 13 in the X-axis direction. In the simulation, a width Wn of the refractive index distribution is determined for each of the five calculation results. The width Wn of the refractive index distribution is the width of the refractive index distribution (the Fresnel jump portion) between the third electrode 13 and the third opposing electrode 23 in the X-axis direction where the refractive index anisotropy is 90% of the peak of the Fresnel jump portion.

The horizontal axis of FIG. 5B is the proportion W23p/W13. The vertical axis of FIG. 5B is the proportion Wn/LP of the width Wn of the refractive index distribution to a lens pitch LP. The lens pitch LP is the distance along the X-axis direction between the center 11aC of the first major electrode 11a in the X-axis direction and the center 11bC of the second major electrode 11b in the X-axis direction.

As shown in FIG. 5B, the width Wn can be narrower when the width W23p of the superimposed portion 23p is greater than 0 and not more than ½ of the width W13 of the third electrode 13. In the case where the third opposing electrode 23 opposes the entire third electrode 13 in the X-axis direction, the potential distribution is constant for only the portion of the width of the third electrode 13. In the case where the third opposing electrode 23 is shifted about half of the width of the third electrode 13, the width where the potential distribution is constant becomes narrow. Thereby, it is considered that the width Wn is narrower when the width W23p of the superimposed portion 23p is greater than 0 and not more than ½ of the width W13 of the third electrode 13.

In the case where the width Wn is wide, an apex FP of the Fresnel jump portion has a gentle curvature. Therefore, light rays passing through the apex FP of the Fresnel jump portion are not bent sufficiently by the lens effect; and the possibility of becoming stray light increases. The occurrence of the stray light can be suppressed by reducing the width Wn by adjusting the proportion W23p/W13. In other words, the display quality of the three-dimensional image display can be increased further.

As shown in FIG. 5B, it is more favorable for the proportion W23p/W13 to be not less than 0.2. In other words, the proportion W23p/W13 satisfies the relationship $0.2 \leq W23p/W13 \leq 0.5$. WA, WB, and the proportion WA/WB satisfy the relationship $0.2 \leq WA/WB \leq 0.5$, where the length of the superimposed portion 23p along the X-axis direction is WA and the length of the third electrode 13 along the X-axis direction is WB. Thereby, the width Wn can be reduced more appropriately.

The second opposing electrode 22 has a superimposed portion 22p overlapping the second electrode 12 and a non-superimposed portion 22q not overlapping the second electrode 12 when projected onto the X-Y plane. The non-superimposed portion 22q is positioned between the second electrode 12 and the third electrode 13 when projected onto the X-Y plane. A width (a length along the X-axis direction) W22p of the superimposed portion 22p is, for example, greater than 0 and not more than ½ of a width W12 of the second electrode 12. Thereby, the refractive index distribution 31 can be formed more appropriately in a Fresnel lens-like configuration. The display quality of the three-dimensional image display can be increased further.

Figure 6A:
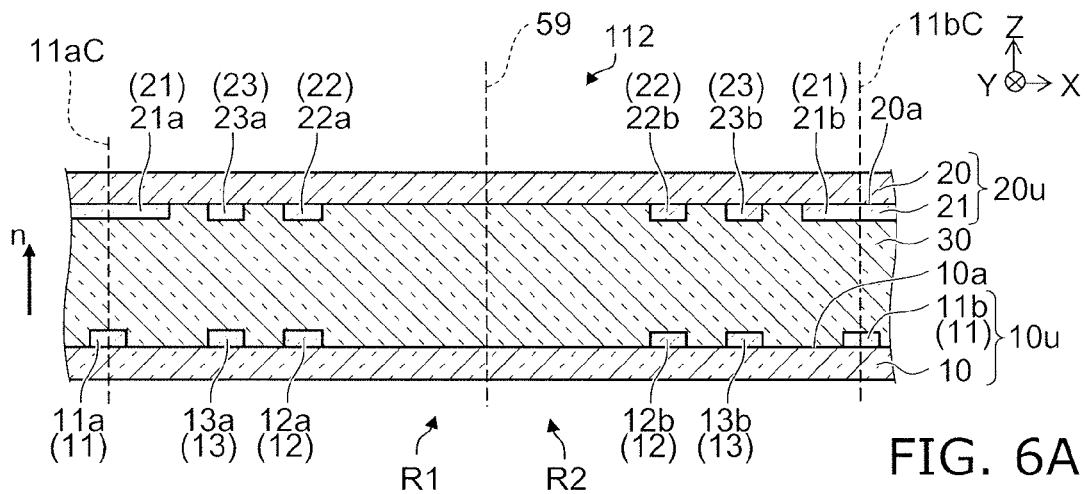
FIG. 6A to FIG. 6C are schematic cross-sectional views showing other liquid crystal optical units according to the first embodiment.
Figure 6B:
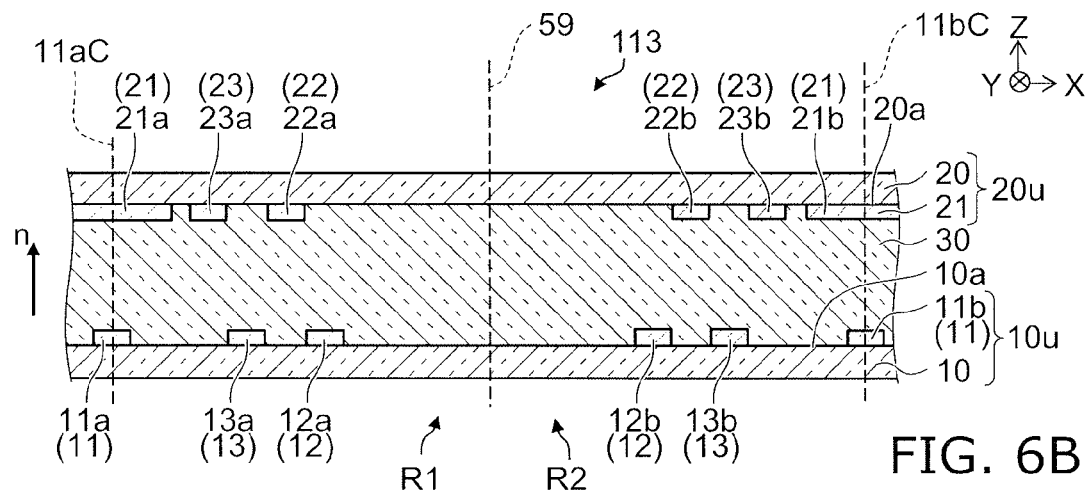
Figure 6C:
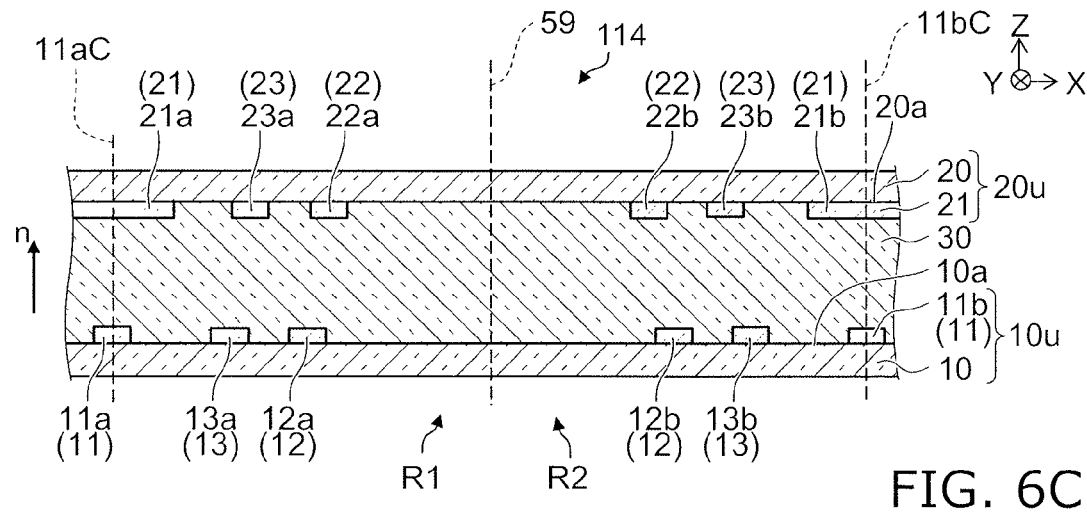

FIG. 6A to FIG. 6C are schematic cross-sectional views showing other liquid crystal optical units according to the first embodiment.

In a liquid crystal optical unit 112 as shown in FIG. 6A, the second opposing electrode 22 overlaps the entire second electrode 12 in the X-axis direction when projected onto the X-Y plane. The third opposing electrode 23 overlaps the entire third electrode 13 in the X-axis direction when projected onto the X-Y plane.

As shown in FIG. 6B, the proportion W23p/W13 is substantially 0 in a liquid crystal optical unit 113. In other words, it is not always necessary for the third opposing electrode 23 to overlap the third electrode 13 when projected onto the X-Y plane. In such a case, the distance along the X-axis direction between the third electrode 13 and the third opposing electrode 23 is, for example, not less than 0 and not more than ½ of the width W13.

In the liquid crystal optical unit 113, the second opposing electrode 22 does not overlap the second electrode 12 when projected onto the X-Y plane. The distance along the X-axis direction between the second electrode 12 and the second opposing electrode 22 is, for example, not less than 0 and not more than ½ of the width W12.

In a liquid crystal optical unit 114 as shown in FIG. 6C, the shift direction of the second opposing electrode 22 with respect to the second electrode 12 and the shift direction of the third opposing electrode 23 with respect to the third electrode 13 are opposite to those of the liquid crystal optical unit 111. In other words, in the liquid crystal optical unit 114, the non-superimposed portion 23q is positioned between the second electrode 12 and the third electrode 13 when projected onto the X-Y plane. The non-superimposed portion 22q is positioned between the first sub electrode 12a and the second sub electrode 12b when projected onto the X-Y plane.

In the liquid crystal optical units 112, 113, and 114 as well, the display quality of the three-dimensional image display can be increased by setting the first potential Ef1, the second potential Ef2, the third potential Ef3, the first opposing potential Es2, the second opposing potential Es2, and the third opposing potential Es3 as recited above.

FIG. 7A to FIG. 7F are graphs showing other characteristics of the liquid crystal optical device and the display apparatus according to the first embodiment.

The vertical axis of FIG. 7A is the first potential Ef1. The horizontal axis of FIG. 7B is the first opposing potential Es1. The vertical axis of FIG. 7C is the second potential Ef2. The horizontal axis of FIG. 7D is the second opposing potential Es2. The vertical axis of FIG. 7E is the third potential Ef3. The horizontal axis of FIG. 7F is the third opposing potential Es3. In FIG. 7A to FIG. 7F, the horizontal axis is the time t.

In the example as shown in FIG. 7A to FIG. 7F, the drive unit 77 implements the first operation in a first interval PD1 and implements the second operation in a second interval PD2. The drive unit 77 repeatedly implements the first operation and the second operation alternately.

In the first operation, the drive unit 77 subjects the first electrodes 11 to the first potential Ef1, subjects the second electrodes 12 to the second potential Ef2 that is not more than the first potential Ef1, subjects the third electrodes 13 to the third potential Ef3 that is lower than the second potential Ef2, subjects the first opposing electrodes 21 to the first opposing potential Es1 that is lower than the first potential Ef1, subjects the second opposing electrodes 22 to the second opposing potential Es2 that is lower than the second potential Ef2, and subjects the third opposing electrodes 23 to the third opposing potential Es3 that is higher than the second opposing potential Es2. Thereby, the first voltage V1 is applied; the second voltage V2 that is not more than the first voltage V1 is applied; and the third voltage V3 that is lower than the second voltage V2 is applied.

For example, in the first operation, the drive unit 77 sets the first electrodes 11 to 3.5 V, sets the second electrodes 12 to 0.1 V, sets the third electrodes 13 to −2.2 V, sets the first opposing electrodes 21 to −3.5 V, sets the second opposing electrodes 22 to −3.9 V, and sets the third opposing electrodes 23 to −1.5 V.

In the second operation, the drive unit 77 subjects the first opposing electrodes 21 to the first opposing potential Es1, subjects the second opposing electrodes 22 to the second opposing potential Es2 that is not more than the first opposing potential Es1, subjects the third opposing electrodes 23 to the third opposing potential Es3 that is lower than the second opposing potential Es2, subjects the first electrodes 11 to the first potential Ef1 that is lower than the first opposing potential Es1, subjects the second electrodes 12 to the second potential Ef2 that is lower than the second opposing potential Es2, and subjects the third electrodes 13 to the third potential Ef3 that is higher than the second potential Ef2. Thereby, the first voltage V1 is applied; the second voltage V2 that is not more than the first voltage V1 is applied; and the third voltage V3 that is lower than the second voltage V2 is applied.

For example, in the second operation, the drive unit 77 sets the first electrodes 11 to −3.5 V, sets the second electrodes 12 to −0.1 V, sets the third electrodes 13 to 2.2 V, sets the first opposing electrodes 21 to 3.5 V, sets the second opposing electrodes 22 to 3.9 V, and sets the third opposing electrodes 23 to 1.5 V.

In other words, in the example, the potentials of the first to third electrodes 11 to 13 and the potentials of the first to third opposing electrodes 21 to 23 are reversed between the first interval PD1 and the second interval PD2.

Thus, in the case where the first to third voltages V1 to V3 are applied, the effects of the electric field between the first electrode 11 and the third electrode 13 and the electric field between the second electrode 12 and the third electrode 13 in the first interval PD1 can be suppressed; and an appropriate refractive index difference in the liquid crystal layer 30 can be obtained. On the other hand, the effects of the electric field between the first opposing electrode 21 and the third opposing electrode 23 and the electric field between the second opposing electrode 22 and the third opposing electrode 23 can be suppressed in the second interval PD2; and an appropriate refractive index difference in the liquid crystal layer 30 can be obtained.

Thus, in at least one operation, it is sufficient for the drive unit 77 to have a state in which the first electrodes 11 are subjected to the first potential Ef1, the second electrodes 12 are subjected to the second potential Ef2, the third electrodes 13 are subjected to the third potential Ef3 that is lower than the second potential Ef2, the first opposing electrodes 21 are subjected to the first opposing potential Es1 that is lower than the first potential Ef1, the second opposing electrodes 22 are subjected to the second opposing potential Es2 that is lower than the second potential Ef2, and the third opposing electrodes 23 are subjected to have the third opposing potential Es3 that is higher than the second opposing potential Es2. For example, the first potential Ef1, the second potential Ef2, the third potential Ef3, the first opposing potential Es1, the second opposing potential Es2, and the third opposing potential Es3 may be changed as in an alternating current.

In the embodiment, level shift driving may be performed. For example, a positive potential may be supplied to the electrodes. For example, the drive unit 77 sets the first potential Ef1 to be 8 V, sets the second potential Ef2 to be 4 V, sets the third potential Ef3 to be 2 V, sets the first opposing potential Es1 to be 1 V, sets the second opposing potential Es2 to be 0 V, and sets the third opposing potential Es3 to be 2.5 V. In such a case as well, the relationship between the potentials (and the relationship between the voltages) recited above is satisfied. Such potentials are supplied in the first operation (e.g., the first interval PD1).

In such a case, in the second operation (the second interval PD2), for example, the drive unit 77 sets the first potential Ef1 to be 0 V, sets the second potential Ef2 to be 4 V, sets the third potential Ef3 to be 6 V, sets the first opposing potential Es1 to be 7 V, sets the second opposing potential Es2 to be 8 V, and sets the third opposing potential Es3 to be 5.5 V. Thereby, the relationship between the potentials (and the relationship between the voltages) recited above is satisfied while applying alternating current voltages to the liquid crystal layer 30. All of the potentials supplied by the drive unit 77 are positive potentials or a potential of 0.

Second Embodiment

Figure 8A:
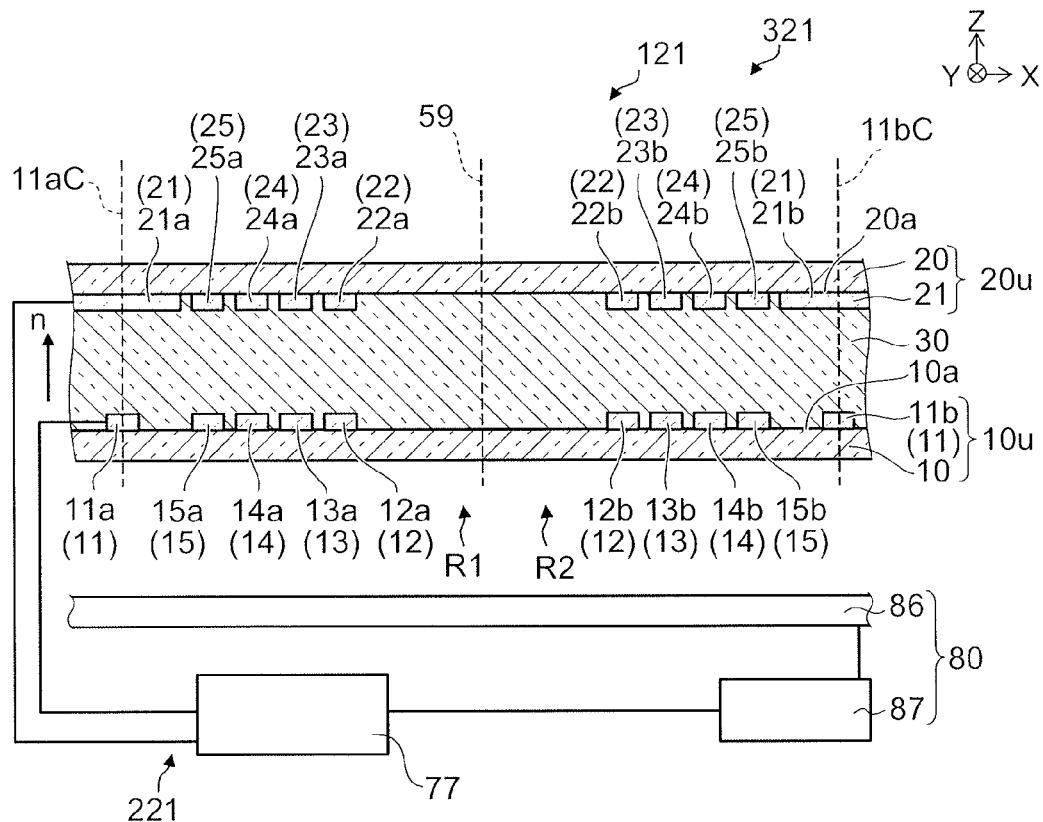
FIG. 8A and FIG. 8B are schematic views showing a liquid crystal optical device and a display apparatus according to a second embodiment.
Figure 8B:
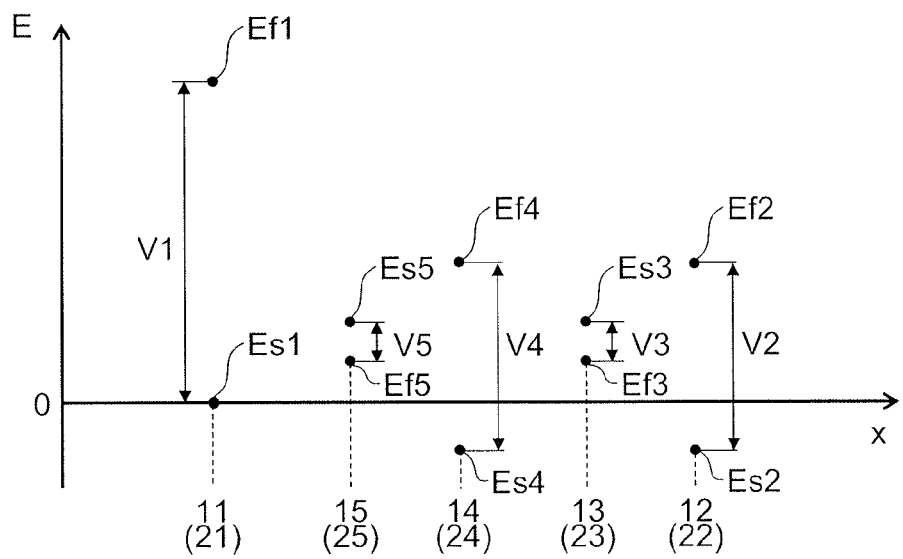

FIG. 8A and FIG. 8B are schematic views showing a liquid crystal optical device and a display apparatus according to a second embodiment.

FIG. 8A is a schematic cross-sectional view showing the liquid crystal optical device 221 and the display apparatus 321 according to the second embodiment.

FIG. 8B is a graph showing a characteristic of the liquid crystal optical device 221 and the display apparatus 321 according to the second embodiment. In FIG. 8B, the horizontal axis is the X-axis direction position x; and the vertical axis is the potential E.

In a liquid crystal optical unit 121 of the liquid crystal optical device 221 in the example as shown in FIG. 8A, the first substrate unit 10u further includes multiple fourth electrodes 14 and multiple fifth electrodes 15; and the second substrate unit 20u further includes multiple fourth opposing electrodes 24 and multiple fifth opposing electrodes 25.

The multiple fourth electrodes 14 are provided between the multiple first electrodes 11 and the multiple third electrodes 13 on the first major surface 10a. The multiple fourth electrodes 14 extend in the Y-axis direction. One of the multiple fourth electrodes 14 is taken as a fifth sub electrode 14a. One other of the multiple fourth electrodes 14 is taken as a sixth sub electrode 14b. The fifth sub electrode 14a is disposed between the first major electrode 11a and the third sub electrode 13a. The sixth sub electrode 14b is disposed between the second major electrode 11b and the fourth sub electrode 13b.

The multiple fifth electrodes 15 are provided between the multiple first electrodes 11 and the multiple fourth electrodes 14 on the first major surface 10a. The multiple fifth electrodes 15 extend in the Y-axis direction. One of the multiple fifth electrodes 15 is taken as a seventh sub electrode 15a. One other of the multiple fifth electrodes 15 is taken as an eighth sub electrode 15b. The seventh sub electrode 15a is disposed between the first major electrode 11a and the fifth sub electrode 14a. The eighth sub electrode 15b is disposed between the second major electrode 11b and the sixth sub electrode 14b.

The multiple fourth opposing electrodes 24 are provided on the second major surface 20a. The multiple fourth opposing electrodes 24 extend in the Y-axis direction. The multiple fourth opposing electrodes 24 are separated from the multiple first opposing electrodes 21, the multiple second opposing electrodes 22, and the multiple third opposing electrodes 23 in the X-axis direction. The multiple fourth opposing electrodes 24 respectively overlap at least portions of the multiple fourth electrodes 14 when projected onto the X-Y plane. Thus, each of the multiple fourth opposing electrodes 24 partly or wholly overlaps each of the multiple fourth electrodes 14 when projected onto the X-Y plane. One of the fourth opposing electrodes 24 overlapping the fifth sub electrode 14a when projected onto the X-Y plane is taken as a fifth opposing sub electrode 24a. One other of the fourth opposing electrodes 24 overlapping the sixth sub electrode 14b when projected onto the X-Y plane is taken as a sixth opposing sub electrode 24b.

The multiple fifth opposing electrodes 25 are provided on the second major surface 20a. The multiple fifth opposing electrodes 25 extend in the Y-axis direction. The multiple fifth opposing electrodes 25 are separated from the multiple first opposing electrodes 21, the multiple second opposing electrodes 22, the multiple third opposing electrodes 23, and the multiple fourth opposing electrodes 24 in the X-axis direction. The multiple fifth opposing electrodes 25 respectively overlap at least portions of the multiple fifth electrodes 15 when projected onto the X-Y plane. Thus, each of the multiple fifth opposing electrodes 25 partly or wholly overlaps each of the multiple fifth electrodes 15 when projected onto the X-Y plane. One of the fifth opposing electrodes 25 overlapping the seventh sub electrode 15a when projected onto the X-Y plane is taken as a seventh opposing sub electrode 25a. One other of the fifth opposing electrodes 25 overlapping the eighth sub electrode 15b when projected onto the X-Y plane is taken as an eighth opposing sub electrode 25b.

As shown in FIG. 8B, in the operation of applying the first to third voltages V1 to V3, the drive unit 77 applies a fourth voltage V4 that is not more than the first voltage V1 between the fourth electrode 14 and the fourth opposing electrode 24 and applies a fifth voltage V5 that is less than the fourth voltage V4 between the fifth electrode 15 and the fifth opposing electrode 25 by subjecting the fourth electrodes 14 to a fourth potential Ef4 that is not more than the first potential Ef1, subjecting the fifth electrodes 15 to a fifth potential Ef5 that is lower than the fourth potential Ef4, subjecting the fourth opposing electrodes 24 to a fourth opposing potential Es4 that is lower than the fourth potential Ef4, and subjecting the fifth opposing electrodes 25 to a fifth opposing potential Es5 that is higher than the fourth opposing potential Es4.

For example, the fourth potential Ef4 is substantially the same as the second potential Ef2. For example, the fifth potential Ef5 is substantially the same as the third potential Ef3. For example, the fourth opposing potential Es4 is substantially the same as the second opposing potential Es2. For example, the fifth opposing potential Es5 is substantially the same as the third opposing potential Es3. Thereby, in the liquid crystal optical device 221, the refractive index distribution 31 having a multi-zone Fresnel lens configuration can be formed in the liquid crystal layer 30 of the liquid crystal optical unit 121.

In the liquid crystal optical device 221, by applying the fourth voltage V4 and the fifth voltage V5 as recited above, for example, the effects of the electric field between the third electrode 13 and the fourth electrode 14, the electric field between the fourth electrode 14 and the fifth electrode 15, and the electric field between the fifth electrode 15 and the first electrode 11 can be suppressed; and an appropriate refractive index difference in the liquid crystal layer 30 can be obtained. In the liquid crystal optical device 221 and the display apparatus 321 as well, high display quality of the three-dimensional image display can be obtained.

More electrodes may be provided in the liquid crystal optical unit. For example, one set made of the second electrode 12, the third electrode 13, the second opposing electrode 22, and the third opposing electrode 23 may be multiply arranged in the X-axis direction. Thereby, the refractive index distribution 31 can be formed in a Fresnel lens-like configuration having more zones.

Third Embodiment

Figure 9A:
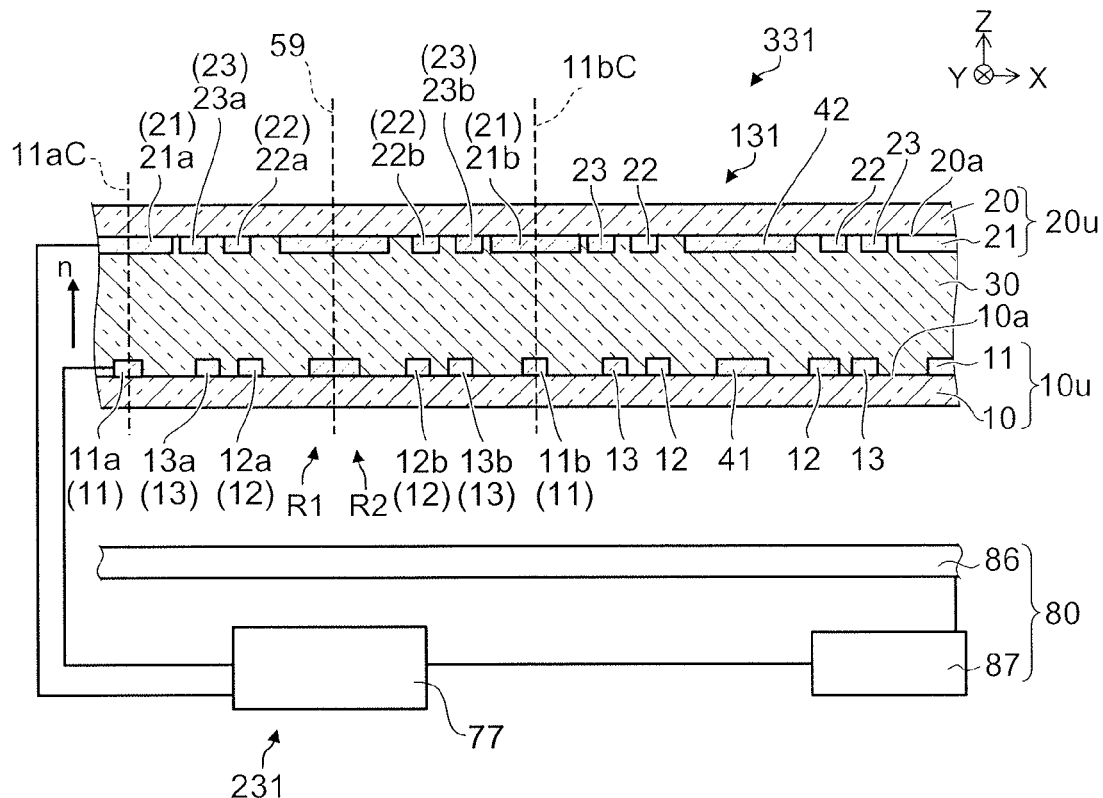
FIG. 9A and FIG. 9B are schematic views showing a liquid crystal optical device and a display apparatus according to a third embodiment.
Figure 9B:
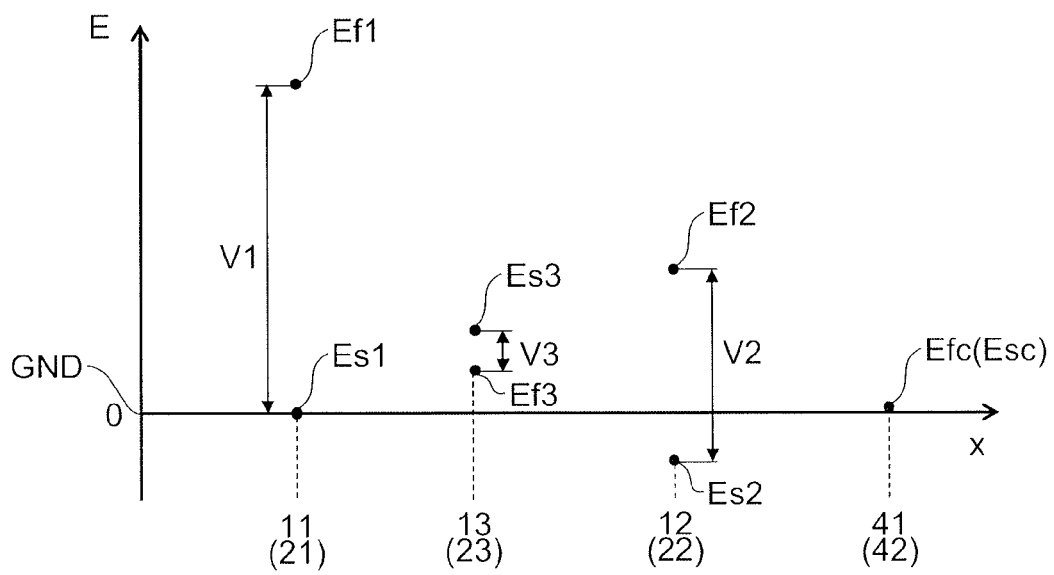

FIG. 9A and FIG. 9B are schematic views showing a liquid crystal optical device and a display apparatus according to a third embodiment.

FIG. 9A is a schematic cross-sectional view showing the liquid crystal optical device 231 and the display apparatus 331 according to the third embodiment.

FIG. 9B is a graph showing a characteristic of the liquid crystal optical device 231 and the display apparatus 331 according to the third embodiment. In FIG. 9B, the horizontal axis is the X-axis direction position x; and the vertical axis is the potential E.

In a liquid crystal optical unit 131 of the liquid crystal optical device 231 in the example as shown in FIG. 9A, the first substrate unit 10u further includes multiple central electrodes 41; and the second substrate unit 20u further includes multiple central opposing electrodes 42.

The multiple central electrodes 41 are provided between the multiple first electrodes 11 on the first major surface 10a. The multiple central electrodes 41 extend in the Y-axis direction. The multiple central electrodes 41 overlap the central axis 59 when projected onto the X-Y plane.

The multiple central opposing electrodes 42 are provided on the second major surface 20a. The multiple central opposing electrodes 42 extend in the Y-axis direction. The multiple central opposing electrodes 42 are separated from the multiple first opposing electrodes 21, the multiple second opposing electrodes 22, and the multiple third opposing electrodes 23 in the X-axis direction. At least portions of the multiple central opposing electrodes 42 respectively overlap at least portions of the multiple central electrodes 41 when projected onto the X-Y plane. Thus, each of the multiple central opposing electrodes 42 partly or wholly overlaps each of the multiple central electrodes 41 when projected onto the X-Y plane.

As shown in FIG. 9B, in the operation of applying the first to third voltages V1 to V3, the drive unit 77 subjects the central electrodes 41 to a central potential Efc and subjects the central opposing electrodes 42 to a central opposing potential Esc. The central potential Efc is set to be, for example, 0 V. The central opposing potential Esc is set to be, for example, 0 V. The absolute value of the difference between the central potential Efc and the central opposing potential Esc is not more than 0.5 V with respect to the ground potential GND (the reference potential).

Thereby, the initial alignment (the horizontal alignment) can be formed more appropriately in the region of the liquid crystal layer 30 between the first sub electrode 12a and the second sub electrode 12b. The refractive index distribution 31 can be formed more appropriately in a Fresnel lens-like configuration. In other words, in the liquid crystal optical device 231 and the display apparatus 331, the display quality of the three-dimensional image display can be increased further.

Fourth Embodiment

Figure 10:
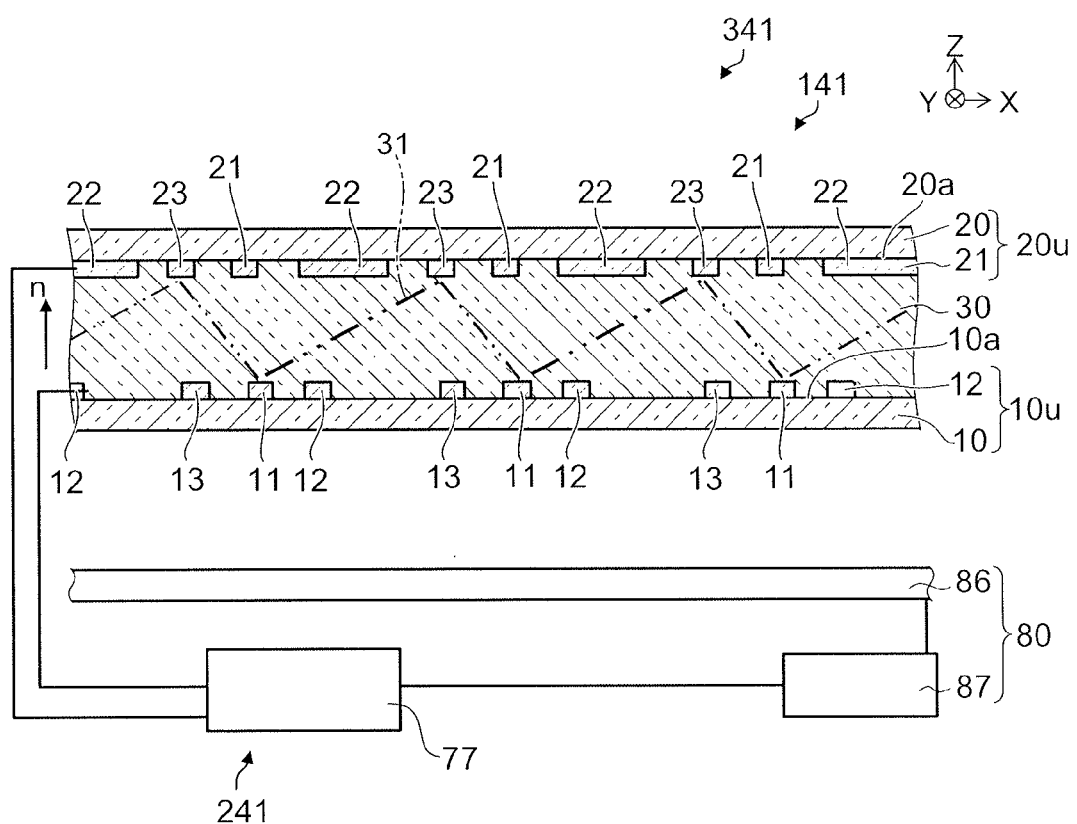
FIG. 10 is a schematic cross-sectional view showing a liquid crystal optical device and a display apparatus according to a fourth embodiment.

FIG. 10 is a schematic cross-sectional view showing a liquid crystal optical device and a display apparatus according to a fourth embodiment.

As shown in FIG. 10, the display apparatus 341 according to the embodiment includes the liquid crystal optical device 241 and the image display unit 80. The liquid crystal optical device 241 includes a liquid crystal optical unit 141 and the drive unit 77. In the liquid crystal optical unit 141 of the example, one of the multiple second electrodes 12 is provided between two most proximal first electrodes 11. One of the multiple third electrodes 13 is provided between one of the two most proximal first electrodes 11 and the one of the multiple second electrodes 12. In other words, in the example, the multiple first electrodes 11, the multiple second electrodes 12, and the multiple third electrodes 13 are repeatedly arranged in the order of the first electrode 11, the second electrode 12, and the third electrode 13.

In the example, there is no lens portion; and the refractive index distribution 31 is formed of only jump portions. In other words, the refractive index distribution 31 is formed in a prism configuration. In the example, the second electrode 12 is provided between the first electrode 11, which is a low refractive index portion, and the third electrode 13, which is a high refractive index portion; and the second opposing electrode 22 is provided between the first opposing electrode 21 and the third opposing electrode 23. Thereby, the tilt of the refractive index difference of the prism is different between the left and right. Here, the refractive index of the portion between the second electrode 12 and the second opposing electrode 22 changes gently. The travel direction of light rays passing through this portion changes to another direction. There is a possibility that the light rays passing through portions other than the portion between the second electrode 12 and the second opposing electrode 22 may become stray light. Therefore, as illustrated in the embodiment, the stray light can be reduced by causing one of the refractive index differences to be abrupt.

In the example as well, the drive unit 77 implements an operation including subjecting the first electrodes 11 to the first potential Ef1, subjecting the second electrodes 12 to the second potential Ef2 that is not more than the first potential Ef1, subjecting the third electrodes 13 to the third potential Ef3 that is lower than the second potential Ef2, subjecting the first opposing electrodes 21 to the first opposing potential Es1 that is lower than the first potential Ef1, subjecting the second opposing electrodes 22 to the second opposing potential Es2 that is lower than the second potential Ef2, and subjecting the third opposing electrodes 23 to the third opposing potential Es3 that is higher than the second opposing potential Es2.

For example, in the first operation, the drive unit 77 sets the first electrodes 11 to 3.2 V, sets the second electrodes 12 to 2.2 V, sets the third electrodes 13 to 1.1 V, sets the first opposing electrodes 21 to −0.8 V, sets the second opposing electrodes 22 to be 0 V, and sets the third opposing electrodes 23 to 1.4 V.

For example, in the second operation, the drive unit 77 sets the first electrodes 11 to −3.2 V, sets the second electrodes 12 to −2.2 V, sets the third electrodes 13 to −1.1 V, sets the first opposing electrodes 21 to 0.8 V, sets the second opposing electrodes 22 to be 0 V, and sets the third opposing electrodes 23 to −1.4 V.

Thereby, in the liquid crystal optical unit 141, the refractive index distribution 31 is formed in a prism configuration in the liquid crystal layer 30.

Figure 11:
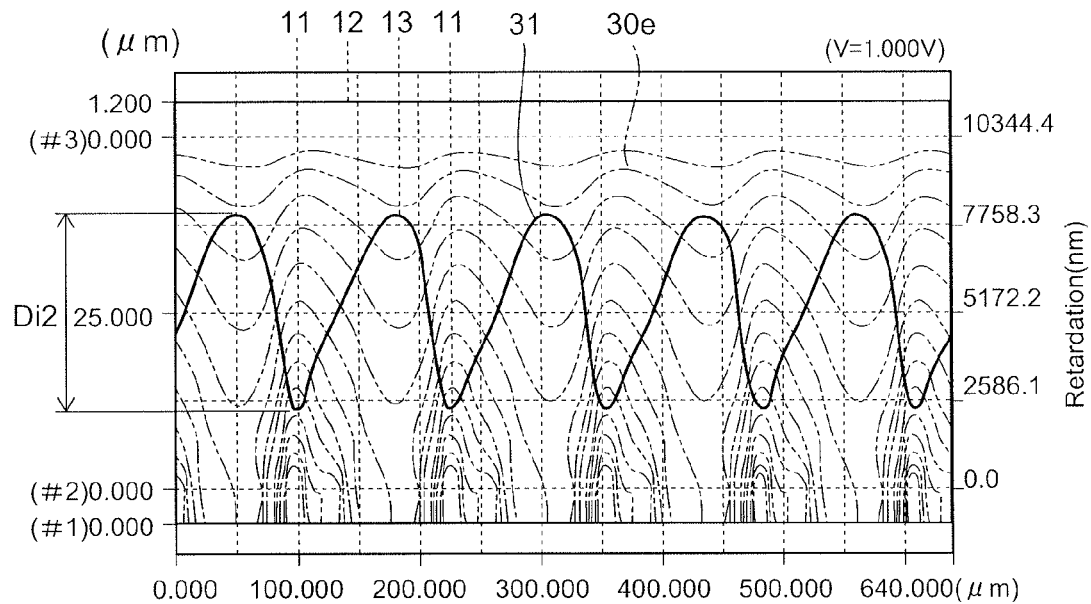
FIG. 11 is a schematic view showing characteristics of the liquid crystal optical unit of the reference example.

FIG. 11 is a schematic view showing characteristics of the liquid crystal optical unit of the reference example.

FIG. 11 shows characteristics of the liquid crystal optical unit of the reference example that uses the opposing electrode 29 in the second substrate unit 20u of the liquid crystal optical unit 141 instead of the multiple first opposing electrodes 21, the multiple second opposing electrodes 22, and the multiple third opposing electrodes 23. FIG. 11 schematically shows simulation results of an equipotential distribution 30e and the refractive index distribution 31 of the liquid crystal layer 30 of the liquid crystal optical unit of the reference example. In FIG. 11, the horizontal axis is the X-axis direction position; and the vertical axis is the Z-axis direction position.

Figure 12:
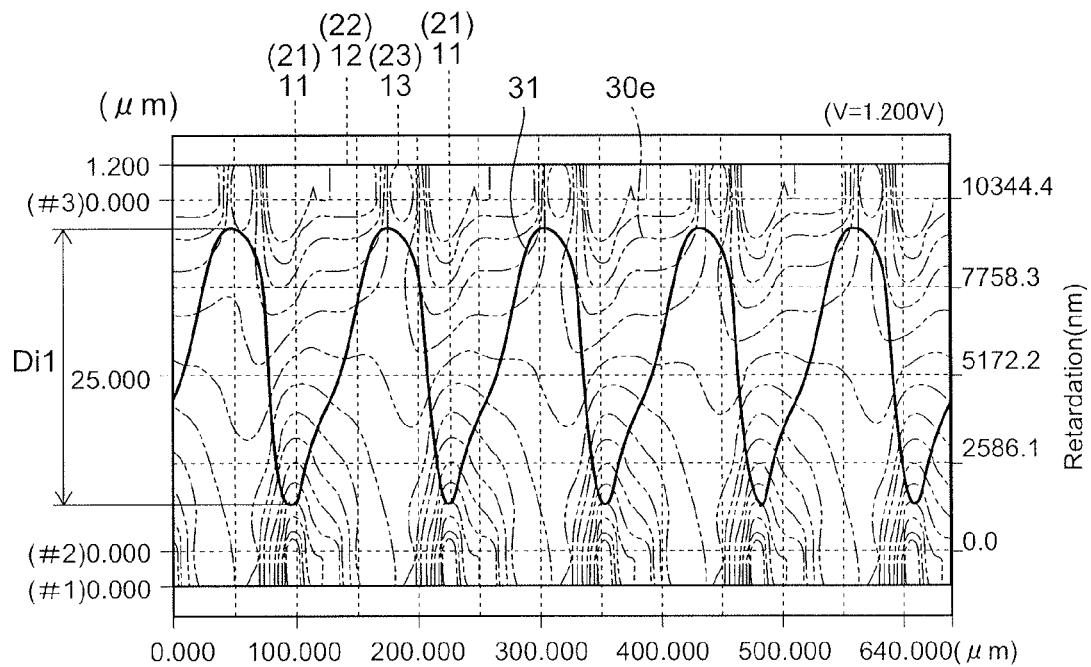
FIG. 12 is a schematic view showing characteristics of the liquid crystal optical device and the display apparatus according to the fourth embodiment.

FIG. 12 is a schematic view showing characteristics of the liquid crystal optical device and the display apparatus according to the fourth embodiment.

FIG. 12 schematically shows simulation results of the equipotential distribution 30e and the refractive index distribution 31 of the liquid crystal layer 30 of the liquid crystal optical unit 141. In FIG. 12, the horizontal axis is the X-axis direction position; and the vertical axis is the Z-axis direction position.

As shown in FIG. 11 and FIG. 12, a refractive index difference Di1 of the refractive index distribution 31 of the liquid crystal optical unit 141 is larger than a refractive index difference Di2 of the refractive index distribution 31 of the liquid crystal optical unit of the reference example. In the liquid crystal optical device 241 and the display apparatus 341 according to the embodiment, the effects of the electric field between the first electrode 11 and the third electrode 13 and the electric field between the second electrode 12 and the third electrode 13 can be suppressed; and the appropriate refractive index difference in the liquid crystal layer 30 can be obtained. In the liquid crystal optical device 241 and the display apparatus 341, the refractive index distribution 31 having a good prism configuration can be obtained. In the liquid crystal optical device 241 and the display apparatus 341, high display quality of the three-dimensional image display can be obtained.

Fifth Embodiment

Figure 13A:
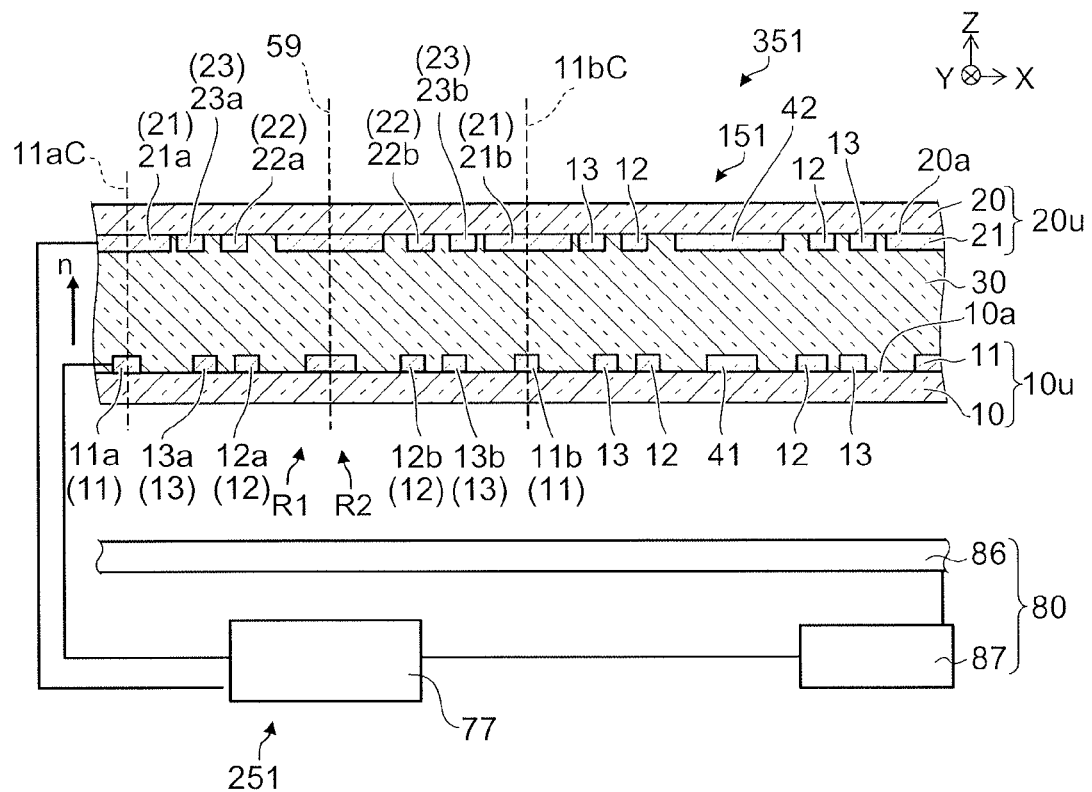
FIG. 13A and FIG. 13B are schematic views showing a liquid crystal optical device and a display apparatus according to a fifth embodiment.
Figure 13B:
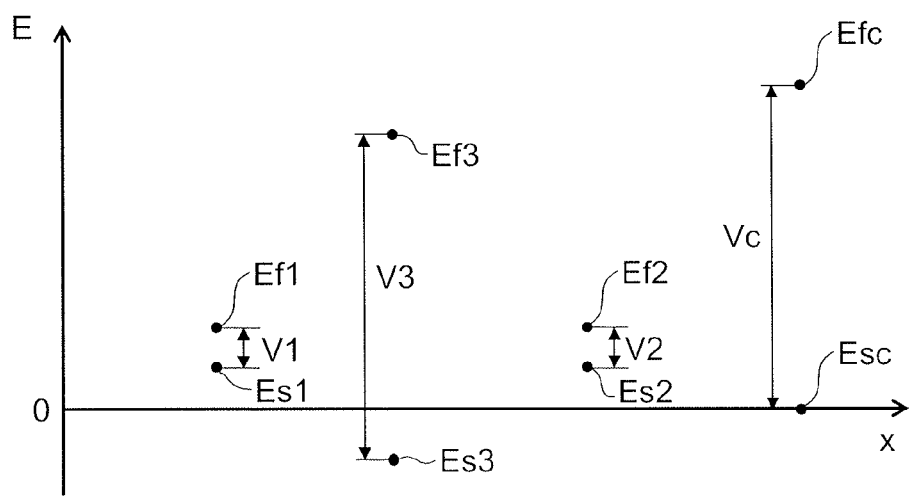

FIG. 13A and FIG. 13B are schematic views showing a liquid crystal optical device and a display apparatus according to a fifth embodiment.

FIG. 13A is a schematic cross-sectional view showing the liquid crystal optical device 251 and the display apparatus 351 according to the fifth embodiment.

FIG. 13B is a graph showing a characteristic of the liquid crystal optical device 251 and the display apparatus 351 according to the fifth embodiment. In FIG. 13B, the horizontal axis is the X-axis direction position x; and the vertical axis is the potential E.

As shown in FIG. 13A, the display apparatus 351 according to the embodiment includes the liquid crystal optical device 251 and the image display unit 80. The liquid crystal optical device 251 includes a liquid crystal optical unit 151 and the drive unit 77. Similarly to the first substrate unit 10u of the liquid crystal optical unit 131, the first substrate unit 10u of the liquid crystal optical unit 151 includes the multiple first electrodes 11, the multiple second electrodes 12, the multiple third electrodes 13, and the multiple central electrodes 41. Similarly to the second substrate unit 20u of the liquid crystal optical unit 131, the second substrate unit 20u of the liquid crystal optical unit 151 includes the multiple first opposing electrodes 21, the multiple second opposing electrodes 22, the multiple third opposing electrodes 23, and the multiple central opposing electrodes 42. In the example, the dielectric anisotropy of the liquid crystal included in the liquid crystal layer 30 is negative; and the initial alignment is the vertical alignment.

In the example as shown in FIG. 13B, the drive unit 77 implements an operation including subjecting the first electrodes 11 to the first potential Ef1, subjecting the second electrodes 12 to the second potential Ef2 that is not less than the first potential Ef1, subjecting the third electrodes 13 to the third potential Ef3 that is higher than the second potential Ef2, subjecting the first opposing electrodes 21 to the first opposing potential Es1 that is lower than the first potential Ef1, subjecting the second opposing electrodes 22 to the second opposing potential Es2 that is lower than the second potential Ef2, and subjecting the third opposing electrodes 23 to the third opposing potential Es3 that is lower than the second opposing potential Es2.

By subjecting the potentials of the electrodes as recited above, the drive unit 77 applies the first voltage V1 between the first electrode 11 and the first opposing electrode 21, applies the second voltage V2 that is not less than the first voltage V1 between the second electrode 12 and the second opposing electrode 22, and applies the third voltage V3 that is higher than the second voltage V2 between the third electrode 13 and the third opposing electrode 23.

The drive unit 77 subjects the central electrodes 41 to the central potential Efc that is not less than the third opposing potential Es3 and subjects the central opposing electrodes 42 to the central opposing potential Esc that is lower than the central potential Efc. Thereby, the drive unit 77 applies a central voltage Vc that is not less than the third voltage V3 between the central electrode 41 and the central opposing electrode 42. Thereby, the refractive index distribution 31 having a Fresnel lens-like configuration can be formed in the liquid crystal layer 30 including a liquid crystal having a negative dielectric anisotropy.

In the liquid crystal optical device 251 and the display apparatus 351 according to the embodiment, the third opposing potential Es3 of the third opposing electrodes 23 is lower than the second opposing potential Es2 of the second opposing electrodes 22. Thereby, the potential difference between the first potential Ef1 and the third potential Ef3 can be suppressed while applying the third voltage V3 of an appropriate magnitude. The potential difference between the second potential Ef2 and the third potential Ef3 can be suppressed. In other words, the electric field between the first electrode 11 and the third electrode 13 can be suppressed. The electric field between the second electrode 12 and the third electrode 13 can be suppressed.

Thus, in the liquid crystal optical device 251 and the display apparatus 351 according to the embodiment, the effects of the electric field between the first electrode 11 and the third electrode 13 and the electric field between the second electrode 12 and the third electrode 13 can be suppressed; and an appropriate refractive index difference in the liquid crystal layer 30 can be obtained. In the liquid crystal optical device 251 and the display apparatus 351, the refractive index distribution 31 having an appropriate configuration can be obtained. High display quality of the three-dimensional image display can be obtained.

For example, the polarity of the third opposing potential Es3 is set to be the reverse polarity with respect to the polarity of the first potential Ef1 and the polarity of the second opposing potential Es2. Thereby, for example, the potential difference between the first potential Ef1 and the third potential Ef3 and the potential difference between the second potential Ef2 and the third potential Ef3 can be suppressed more appropriately.

According to the embodiment, a liquid crystal optical device and a display apparatus that provide a high-quality display can be provided.

In the specification of the application, "perpendicular" and "parallel" refer to not only strictly perpendicular and strictly parallel but also include, for example, the fluctuation due to manufacturing processes, etc.; and it is sufficient to be substantially perpendicular and substantially parallel. In the specification of the application, the state of being "provided on" includes not only the state of being provided in direct contact but also the state of being provided with another component inserted therebetween. The state of being "stacked" includes not only the state of being overlaid with mutual contact but also the state of overlapping with another component inserted therebetween. The state of being "opposed" includes not only the state of directly facing each other but also the state of facing each other with another component inserted therebetween.

Hereinabove, embodiments of the invention are described with reference to specific examples. However, the invention is not limited to these specific examples. For example, one skilled in the art may similarly practice the invention by appropriately selecting specific configurations of components included in the liquid crystal optical device and the display apparatus such as the liquid crystal optical unit, the drive unit, the display unit, the image display unit, the first substrate unit, the second substrate unit, the liquid crystal layer, the first substrate, the second substrate, the first to fifth electrodes, the first to fifth opposing electrodes, the central electrode, the central opposing electrode, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical devices and display apparatuses practicable by an appropriate design modification by one skilled in the art based on the liquid crystal optical devices and the display apparatuses described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical device, comprising:
    a liquid crystal optical unit including
        a first substrate unit including
            a first substrate having a first major surface,
            a plurality of first electrodes provided on the first major surface to extend in a first direction, the first electrodes being arranged in an intersecting direction intersecting the first direction,
            a second electrode provided between the first electrodes on the first major surface to extend in the first direction, and
            a third electrode provided between the second electrode and one of the first electrodes on the first major surface to extend in the first direction,
        a second substrate unit including
            a second substrate having a second major surface facing the first major surface,
            a plurality of first opposing electrodes provided on the second major surface to extend in the first direction, each of the first opposing electrodes partly or wholly overlapping each of the first electrodes when projected onto a plane parallel to the first major surface,
            a second opposing electrode provided on the second major surface to extend in the first direction, the second opposing electrode being separated from the first opposing electrodes in the intersecting direction, the second opposing electrode partly or wholly overlapping the second electrode when projected onto the plane, and
            a third opposing electrode provided on the second major surface to extend in the first direction, the third opposing electrode being separated from the first opposing electrodes and the second opposing electrode in the intersecting direction, the third opposing electrode partly or wholly overlapping the third electrode when projected onto the plane, and
        a liquid crystal layer provided between the first substrate unit and the second substrate unit; and
    a drive unit configured to implement a first operation including subjecting the first electrodes to a first potential, subjecting the second electrode to a second potential, subjecting the third electrode to a third potential, subjecting the first opposing electrodes to a first opposing potential, subjecting the second opposing electrode to a second opposing potential, and subjecting the third opposing electrode to a third opposing potential, the second potential being not more than the first potential, the third potential being lower than the second potential, the first opposing potential being lower than the first potential, the second opposing potential being lower than the second potential, the third opposing potential being higher than the second opposing potential, the absolute value of the difference between the second potential and the second opposing potential being not more than the absolute value of the difference between the first potential and the first opposing potential, the absolute value of the difference between the third potential and the third opposing potential being less than the absolute value of the difference between the second potential and the second opposing potential.

2. The device according to claim 1, wherein
the first substrate unit includes a plurality of the second electrodes and a plurality of the third electrodes,
one of the second electrodes is disposed between a central axis and one of two most proximal first electrodes, the central axis being parallel to the first direction to pass through a midpoint of a line segment connecting a center in a second direction of the one of the two most proximal first electrodes to a center in the second direction of the other of the two most proximal first electrodes, the second direction being perpendicular to the first direction,
one other of the second electrodes is disposed between the central axis and the other of the two most proximal first electrodes,
one of the third electrodes is disposed between the one of the two most proximal first electrodes and the one of the second electrodes, and
one other of the third electrodes is disposed between the other of the two most proximal first electrodes and the one other of the second electrodes.

3. The device according to claim 2, wherein
the first substrate unit further includes:
  a plurality of fourth electrodes provided between the first electrodes and the third electrodes on the first major surface to extend in the first direction, one of the fourth electrodes being disposed between the one of the two most proximal first electrodes and the one of the third electrodes, one other of the fourth electrodes being disposed between the other of the two most proximal first electrodes and the one other of the third electrodes; and
  a plurality of fifth electrodes provided between the first electrodes and the fourth electrodes on the first major surface to extend in the first direction, one of the fifth electrodes being disposed between the one of the two most proximal first electrodes and the one of the fourth electrodes, one other of the fifth electrodes being disposed between the other of the two most proximal first electrodes and the one other of the fourth electrodes,
the second substrate unit further includes:
  a plurality of fourth opposing electrodes provided on the second major surface to extend in the first direction, the fourth opposing electrodes being separated from the first opposing electrodes, the second opposing electrode, and the third opposing electrode in the intersecting direction, each of the fourth opposing electrodes partly or wholly overlapping each of the fourth electrodes when projected onto the plane; and
  a plurality of fifth opposing electrodes provided on the second major surface to extend in the first direction, the fifth opposing electrodes being separated from the first opposing electrodes, the second opposing electrode, the third opposing electrode, and the fourth opposing electrodes in the intersecting direction, each of the fifth opposing electrodes partly or wholly overlapping each of the fifth electrodes when projected onto the plane,
the drive unit is configured to perform, in the first operation, subjecting the fourth electrodes to a fourth potential, subjecting the fifth electrodes to a fifth potential, subjecting the fourth opposing electrodes to a fourth opposing potential, and subjecting the fifth opposing electrodes to a fifth opposing potential, the fourth potential being not more than the first potential, the fifth potential being lower than the fourth potential, the fourth opposing potential being lower than the fourth potential, the fifth opposing potential being higher than the fourth opposing potential,
the absolute value of the difference between the fourth potential and the fourth opposing potential is not more than the absolute value of the difference between the first potential and the first opposing potential, and
the absolute value of the difference between the fifth potential and the fifth opposing potential is less than the absolute value of the difference between the fourth potential and the fourth opposing potential.

4. The device according to claim 2, wherein
the first substrate unit further includes a central electrode provided between the first electrodes on the first major surface to extend in the first direction, the central electrode overlapping the central axis when projected onto the plane,
the second substrate unit further includes a central opposing electrode provided on the second major surface to extend in the first direction, the central opposing electrode being separated from the first opposing electrodes, the second opposing electrode, and the third opposing electrode in the intersecting direction,
the central opposing electrode partly or wholly overlaps the central electrode when projected onto the plane,
the drive unit is configured to perform, in the first operation, subjecting the central electrode to a central potential and subjecting the central opposing electrode to a central opposing potential, and
the absolute value of the difference between the central potential and the central opposing potential is not more than 0.5 V.

5. The device according to claim 1, wherein
the first substrate unit includes a plurality of the second electrodes and a plurality of the third electrodes,
one of the second electrodes is provided between two most proximal first electrodes, and
one of the third electrodes is provided between one of the two most proximal first electrodes and the one of the second electrodes.

6. The device according to claim 1, wherein a polarity of the second opposing potential is the reverse of a polarity of the third opposing potential.

7. The device according to claim 1, wherein the drive unit in the first operation satisfies the condition $$|(Ef2+Es2)/2-(Ef3+Es3)/2|<2|Ef3-Es3|$$

where the second potential is Ef2, the second opposing potential is Es2, the third potential is Ef3, and the third opposing potential is Es3.

8. The device according to claim 1, wherein
the third opposing electrode has a superimposed portion overlapping the third electrode and a non-superimposed portion not overlapping the third electrode when projected onto the plane, the non-superimposed portion is positioned between the first electrode and the third electrode when projected onto the plane, and
a length of the superimposed portion along a second direction perpendicular to the first direction is greater than 0 and not more than ½ of a length of the third electrode along the second direction.

9. The device according to claim 8, wherein WA, WB, and a proportion WA/WB satisfy the relationship $0.2 \leq WA/WB \leq 0.5$, where WA is the length of the superimposed portion along the second direction, and WB is the length of the third electrode along the second direction.

10. The device according to claim 1, wherein the first substrate, the first electrodes, the second electrode, the third electrode, the second substrate, the first opposing electrodes, the second opposing electrode, and the third opposing electrode are light-transmissive.

11. The device according to claim 10, wherein the first electrodes, the second electrode, the third electrode, the first opposing electrodes, the second opposing electrode, and the third opposing electrode include an oxide including at least one element selected from the group consisting of In, Sn, Zn, and Ti.

12. The device according to claim 1, wherein a dielectric anisotropy of a liquid crystal included in the liquid crystal layer is positive.

13. The device according to claim 1, wherein
the third opposing electrode has a superimposed portion overlapping the third electrode and a non-superimposed portion not overlapping the third electrode when projected onto the plane, and
the non-superimposed portion is positioned between the second electrode and the third electrode when projected onto the plane.

14. The device according to claim 1, wherein the drive unit further implements a second operation, the second opposing potential being not more than the first opposing potential, the third opposing potential being lower than the second opposing potential, the first potential being lower than the first opposing potential, the second potential being lower than the second opposing potential, the third potential being higher than the second potential.

15. The device according to claim 14, wherein the drive unit repeatedly implements the first operation and the second operation alternately.

16. A display apparatus, comprising:
the liquid crystal optical device according to claim 1; and
an image display unit stacked with the liquid crystal optical unit, the image display unit including a display unit configured to emit light including image information to be incident on the liquid crystal layer.

17. a liquid crystal optical device, comprising:
a liquid crystal optical unit including
a first substrate unit including
a first substrate having a first major surface,
a plurality of first electrodes provided on the first major surface to extend in the first direction, the first electrodes being arranged in an intersecting direction intersecting the first direction,
a second electrode provided between the first electrodes on the first major surface to extend in the first direction, and
a third electrode provided between the second electrode and one of the first electrodes on the first major surface to extend in the first direction,
a second substrate unit including
a second substrate having a second major surface facing the first major surface,
a plurality of first opposing electrodes provided on the second major surface to extend in the first direction, each of the first opposing electrodes partly or wholly overlapping each of the first electrodes when projected onto a plane parallel to the first major surface,
a second opposing electrode provided on the second major surface to extend in the first direction, the second opposing electrode being separated from the first opposing electrodes in the intersecting direction, the second opposing electrode partly or wholly overlapping the second electrode when projected onto the plane, and
a third opposing electrode provided on the second major surface to extend in the first direction, the third opposing electrode being separated from the first opposing electrodes and the second opposing electrode in the intersecting direction, the third opposing electrode partly or wholly overlapping the third electrode when projected onto the plane, and
a liquid crystal layer provided between the first substrate unit and the second substrate unit; and
a drive unit configured to implement an operation including subjecting the first electrodes to a first potential, subjecting the second electrode to a second potential, subjecting the third electrode to a third potential, subjecting the first opposing electrodes to a first opposing potential, subjecting the second opposing electrode to a second opposing potential, and subjecting the third opposing electrode to a third opposing potential, the second potential being not less than the first potential, the third potential being higher than the second potential, the first opposing potential being lower than the first potential, the second opposing potential being lower than the second potential, the third opposing potential being lower than the second opposing potential, the absolute value of the difference between the second potential and the second opposing potential being not less than the absolute value of the difference between the first potential and the first opposing potential, the absolute value of the difference between the third potential and the third opposing potential being greater than the absolute value of the difference between the second potential and the second opposing potential.

18. The device according to claim 17, wherein a dielectric anisotropy of a liquid crystal included in the liquid crystal layer is negative.

19. The device according to claim 17, wherein
the first substrate unit includes a plurality of the second electrodes and a plurality of the third electrodes,
one of the second electrodes is disposed between a central axis and one of two most proximal first electrodes, the central axis being parallel to the first direction to pass through a midpoint of a line segment connecting a center in a second direction of the one of the two most proximal first electrodes to a center in the second direction of the other of the two most proximal first electrodes, the second direction being perpendicular to the first direction,
one other of the second electrodes is disposed between the central axis and the other of the two most proximal first electrodes,
one of the third electrodes is disposed between the one of the two most proximal first electrodes and the one of the second electrodes, and one other of the third electrodes is disposed between the other of the two most proximal first electrodes and the one other of the second electrodes.

20. The device according to claim 19, wherein the first substrate unit further includes a central electrode provided between the first electrodes on the first major surface to extend in the first direction, the central electrode overlapping the central axis when projected onto the plane, the second substrate unit further includes a central opposing electrode provided on the second major surface to extend in the first direction, the central opposing electrode being separated from the first opposing electrodes, the second opposing electrode, and the third opposing electrode in the intersecting direction, the central opposing electrode partly or wholly overlapping the central electrode when projected onto the plane, and the drive unit being configured to perform, in the operation, subjecting the central electrode to a central potential and subjecting the central opposing electrode to a central opposing potential, the central potential being not less than the third opposing potential, the central opposing potential being lower than the central potential.

* * * * *